(12) United States Patent
Austin et al.

(10) Patent No.: US 9,549,029 B2
(45) Date of Patent: Jan. 17, 2017

(54) DEVICE-DRIVEN INTELLIGENCE AND FEEDBACK FOR PERFORMANCE OPTIMIZATION AND PLANNING OF A SERVICE NETWORK

(71) Applicants: AT&T Intellectual Property I, L.P., Atlanta, GA (US); AT&T Mobility II LLC, Atlanta, GA (US)

(72) Inventors: Mark Austin, Roswell, GA (US); Michael Bates, Renton, WA (US); Joseph Dennisson, Kennesaw, GA (US); Stephen Kelly, Dunwoody, GA (US); Sheldon Meredith, Marietta, GA (US); Lawrence Ryan, Woodstock, GA (US); Michael Salmon, Loganville, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 14/324,996

(22) Filed: Jul. 7, 2014

(65) Prior Publication Data
US 2014/0325019 A1 Oct. 30, 2014

Related U.S. Application Data

(63) Continuation of application No. 12/775,384, filed on May 6, 2010, now Pat. No. 8,811,977.

(51) Int. Cl.
*H04W 24/00* (2009.01)
*G06F 11/00* (2006.01)
(Continued)

(52) U.S. Cl.
CPC .............. *H04L 67/18* (2013.01); *H04L 41/12* (2013.01); *H04L 41/06* (2013.01); *H04L 41/145* (2013.01); *H04W 4/02* (2013.01); *H04W 24/00* (2013.01)

(58) Field of Classification Search
CPC ............................ H04W 24/04; H04L 41/0654
(Continued)

(56) References Cited

U.S. PATENT DOCUMENTS 5,982,324 A   11/1999   Watters et al.
6,148,219 A   11/2000   Engelbrecht et al.
(Continued)

FOREIGN PATENT DOCUMENTS

WO   2006102505 A1   9/2006
WO   2009054847 A1   4/2009

OTHER PUBLICATIONS

3rd Generation Partnership Project, Technical Specification, "Group GSM/EDGE Radio Access Network, Radio subsystem synchronization (Release 8)", 3GPP TS 45.010 V8.0.0 (May 2008), May 2008, last viewed Jul. 1, 2009, 30 pages.
(Continued)

*Primary Examiner* — Omoniyi Obayanju
(74) *Attorney, Agent, or Firm* — Amin, Turocy & Watson, LLP

(57) ABSTRACT

A subscriber device reports network operation conditions, such as network performance incidents, to receive feedback from the network related to the incident and available or possibly available solutions, and to produce network intelligence suitable for network planning and network performance enhancement. Reporting of network performance incidents can be characterized by location and time of occurrence, wherein this intelligence is provided by the user device. Feedback provided by the network is based on the network performance data received as part of reporting an incident. The reporting described herein enables a network (Continued)

operator to generate network planning intelligence based on actual network performance as experienced at the subscriber level.

20 Claims, 24 Drawing Sheets

(51) Int. Cl.
  *H04L 29/08* (2006.01)
  *H04L 12/24* (2006.01)
  *H04W 4/02* (2009.01)
(58) Field of Classification Search
  USPC .......................................... 455/423; 370/216
  See application file for complete search history.

(56) References Cited

U.S. PATENT DOCUMENTS

| | | | |
|---|---|---|---|
| 6,446,123 B1* | 9/2002 | Ballantine et al. | 709/224 |
| 6,453,168 B1 | 9/2002 | McCrady et al. | |
| 6,762,992 B1 | 7/2004 | Lemieux | |
| 6,801,782 B2 | 10/2004 | McCrady et al. | |
| 7,801,542 B1* | 9/2010 | Stewart | G06Q 50/01 455/414.1 |
| 2005/0114504 A1* | 5/2005 | Marolia et al. | 709/224 |
| 2006/0270400 A1* | 11/2006 | DaSilva et al. | 455/423 |
| 2007/0022444 A1* | 1/2007 | Santhoff | 725/69 |
| 2007/0049295 A1* | 3/2007 | Soliman et al. | 455/456.3 |
| 2008/0096566 A1 | 4/2008 | Brunner et al. | |
| 2008/0299992 A1* | 12/2008 | Eitan et al. | 455/456.5 |

OTHER PUBLICATIONS

3rd Generation Partnership Project, Technical Specification, "Group Radio Access Network, UTRAN Iuh interface Node B Application Part (NBAP) signalling (Release 8)", 3GPP TS 25.469 V8.0.0 (Dec. 2008), Dec. 2008, last viewed Jul. 1, 2009, 56 pages.
Sullivan, Mark. "Signs and Wonders: Is AT&T Stepping Up Its Game?" PC World, Dec. 10, 2009, 1 page.
ETSI TS 125 215 V6.4.0 (Sep. 2005). Universal Mobile Telecommunications System (UMTS), Physical layer, Measurements (FDD), 3GPP TS 25.215 version 6.4.0 Release 6). Sep. 2005. Last accessed Jun. 18, 2010, 20 pages.
ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Mar. 2006. Last accessed Jun. 18, 2010, 1211 pages.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupa1.pdf. Last accessed Dec. 24, 2010, 3 pages.
Boser, et al. A training algorithm for optimal margin classifiers. In D. Haussler, editor, 5th Annual ACM Workshop on COLT, pp. 144-152, Pittsburgh, PA, 1992. ACM Press. http://citeseerx.ist.psu.edu/viewdoc/summary?doi=10.1.1.21.3818. Last accessed Dec. 24, 2010, 9 pages.
Hsu, et al. A Practical Guide to Support Vector Classification. Department of Computer Science National Taiwan University, Last updated: Apr. 15, 2010. http://www.csie.ntu.edu.tw/~cjlin/papers/guide/guide.pdf. Last accessed Dec. 24, 2010, 16 pages.
Drucker, et al. Support Vector Regression Machines. http://scholar.google.com/scholar?q=%22Support+Vector+Regression+Machines.%22. Last accessed Dec. 24, 2010, 7 pages.
New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.
Suykens J.A.K., Vandewalle J., "Least squares support vector machine classifiers", Neural Processing Letters, vol. 9, No. 3, Jun. 1999, pp. 293-300.
M. Ferris, and T. Munson. "Interior-point methods for massive support vector machines". SIAM Journal on Optimization 13: 783-804. Jan. 3, 2003, doi:10.1137/S1052623400374379.
David Meyer, Friedrich Leisch, and Kurt Hornik. "The support vector machine under test." Neurocomputing 55(1-2): 169-186, Jan. 8, 2003.
International Search Report and Written Opinion for PCT/US2011/033815 mailed Jul. 21, 2011, 13 pages.
Office Action dated Jul. 31, 2012 for U.S. Appl. No. 12/775,384, 28 pages.
Office Action dated Feb. 27, 2013 for U.S. Appl. No. 12/775,384, 22 pages.
Office Action dated Jan. 31, 2014 for U.S. Appl. No. 12/775,384, 8 pages.

\* cited by examiner

DEVICE-DRIVEN INTELLIGENCE AND FEEDBACK FOR PERFORMANCE OPTIMIZATION AND PLANNING OF A SERVICE NETWORK

CROSS-REFERENCE TO RELATED APPLICATIONS

This application is a continuation of, and claims the benefit of priority to, U.S. patent application Ser. No. 12/775,384 entitled "DEVICE-DRIVEN INTELLIGENCE AND FEEDBACK FOR PERFORMANCE OPTIMIZATION AND PLANNING OF A SERVICE NETWORK," filed May 6, 2010, the entirety of which application is hereby incorporated by reference herein.

TECHNICAL FIELD

The subject disclosure relates to wireless communications and, more particularly, to enabling a user device to supply network operation data based on specific network performance conditions, and to allow a network that serves the user device to deliver feedback associated with the supplied network operation data and to plan network deployment and to enhance network performance.

BACKGROUND

Service and related customer support significantly affect subscriber attrition. Conventionally, wireless service providers provide various conduits for a subscriber to request support and to report network operation incidents. Subscriber reported problems related to network performance are a vital source of feedback to a network operator, or service provider, as certain subscriber reported problems are visible only to the subscriber, such as when the subscriber attempts to utilize a user mobile device in an area where the network operator does not provides coverage. Such scenario can arise, for example, in areas in which the network operator has a license to a portion of electromagnetic radiation spectrum, but does not provide indoor coverage to a specific building deployed in an operating area for the license.

Nevertheless, regardless of the various conduits, quality of the response of the service provider to a network performance incident is dictated primarily by a limited number of resources generally available for support services in the network; the number of resources is directly related to the number of employees the wireless service provider has in staff or has contracted. In addition, in conventional systems, resolution of network performance incidents that are submitted via the various typical conduits available to a subscriber involves recreating the network performance incident by dispatching technician(s) to a location at which the incident has occurred. Accordingly, customer service becomes costly and is based on rather limited input with respect to information necessary for expeditious and robust resolution of network operation issue(s) that caused the network performance incidents.

DETAILED DESCRIPTION

Figure 1A:
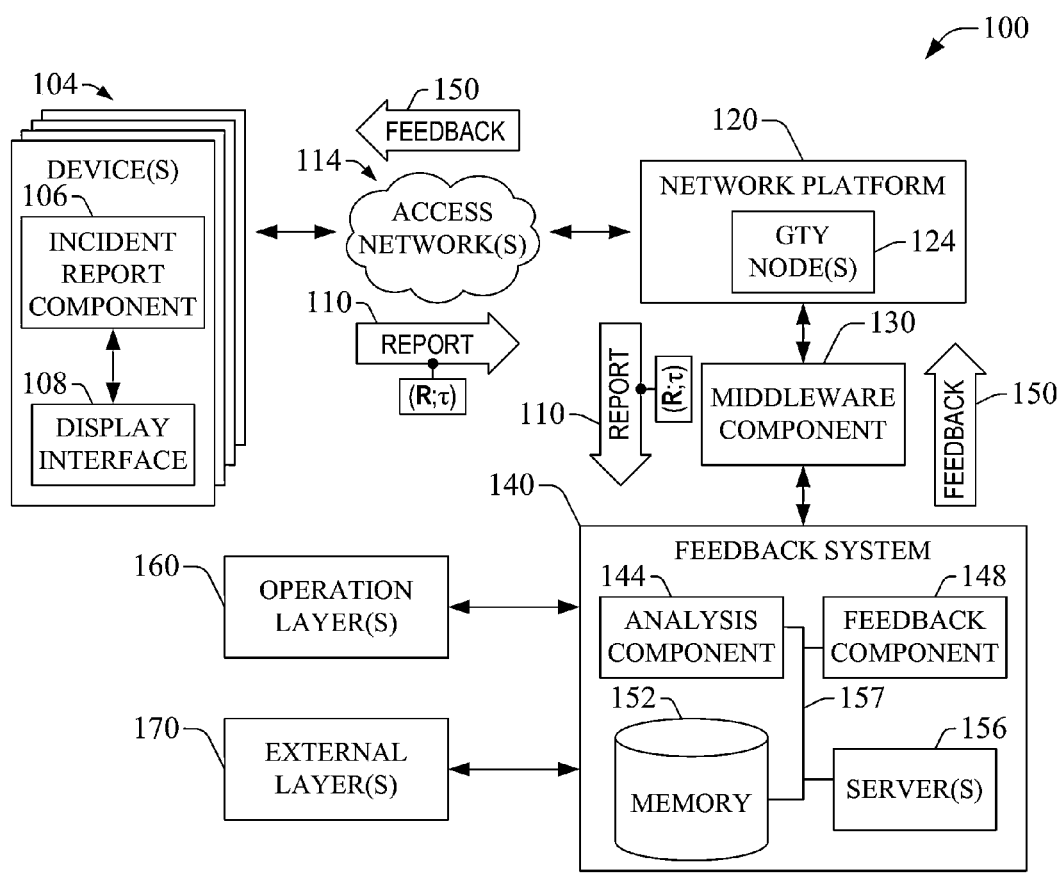
FIG. 1A illustrates a block diagram of an example system that can enable and exploits various aspects described herein.

Several aspects of the subject disclosure are now described with reference to the drawings, wherein like reference numerals are employed to refer to like elements throughout. In the following detailed description, for purposes of explanation, numerous specific details are set forth in order to provide a thorough understanding of the present disclosure. It may be evident, however, that the present invention may be practiced without these specific details. In other instances, well-known structures and devices are shown in block diagram form in order to facilitate describing the present invention.

As used in this application, the terms "component," "system," "platform," "interface," "node," "layer," "tier"

and the like are intended to refer to a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As still yet another example, interface(s) can include input/output (I/O) components as well as associated processor, application, or Application Programming Interface (API) components. While the foregoing examples are directed to illustrative aspects of a component, the illustrated aspects or features also apply to a system, platform, interface, node, layer, and the like.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point;" "base station," "Node B;" "evolved Node B (eNode B);" "home Node B (HNB)" or "home access point (HAP)," which include femtocell access point, picocell access point, Wi-Fi base station, etc.; and the like, are utilized interchangeably in the subject application, and refer to a wireless network component or apparatus that serves and receives data, control, voice, video, sound, gaming, or substantially any data-stream or signaling-stream from a set of subscriber stations. Sources or recipients of such data, control, voice, video, sound, gaming, or substantially any or any data stream or signaling stream can be at least a set of network components such as, but not limited to, user equipment, customer premises equipment, network servers, controllers, gateways or management components. Data and signaling streams can be packetized or frame-based flows. It is noted that context in the subject specification generally distinguishes among a base station that provides or is intended to provide primarily outdoor wireless coverage and a and a facility-based (e.g., home) access point (e.g., femtocell AP) that provides or is intended to provide primarily indoor wireless coverage within a confined range. Explicit distinction between indoor-serving AP and outdoor-serving base station is made when context may be insufficient to distinguish the utilized terms.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. As utilized herein, the term "prosumer" indicate the following contractions: professional-consumer and producer-consumer.

Features or aspects described in the subject disclosure can rely, at least in part, on delivery or reception of directive(s), indication(s), request(s), or the like, and information or payload data (e.g., content(s)) associated therewith. Directive(s) can be embodied in multi-bit words (e.g., P-bit words, with P a positive integer) and coded to specifically convey a request to a particular functional element (e.g., a mobile device, a femtocell AP, a network node) in order to execute one or more specific operation. Information or payload data within signaling, and request(s) or indication(s) conveyed therein, can be embodied, for example, in one or more reserved bits in a packet header, a light-payload (e.g., of the order of 1 byte) data packet, a predetermined multi-bit word conveyed in a control channel, a lightweight file (e.g., a cookie), an email communication, an instant message, or the like. In addition, directive(s), request(s), indication(s), or the like, as described herein, can be delivered in accordance with various communication protocols. As an example, the various protocols can include at least one of file transfer protocol (FTP), secure shell FTP (SFTP), FTP over secure socket layer (FTPS), short message service (SMS) protocol, multimedia messaging service (MMS) protocol, unstructured supplementary service data (USSD) standard, simple network management protocol (SNMP), lightweight directory access protocol (LDAP), session initiation protocol (SIP), SIP for Instant Messaging and Presence Leveraging Extensions (SIMPLE), Open Mobile Alliance (OMA) device management (DM) protocol, Technical Report 069 (TR-069) protocol, also referred to as Customer Premise Equipment (CPE) Wide Area Network (WAN) Management Protocol or CWMP, or the like.

The term "intelligence" as utilized herein with respect to a network refers to substantially any, or any, information that characterizes a wireless network or non-mobile network such for example, coverage area(s), operation marketplace(s), subscriber information, service offerings and associated promotional and advertising campaigns, commercial (e.g., sales, earnings, operational margins, costs) and non-commercial (community outreach, philanthropy . . . ) activities involving offered services or products, or the like. In connection with terminology employed to identify networks, mobile or otherwise, an "owned network," or the like, refers to the network that manages one or more components that perform the various functionalities described in the subject specification, a "competing network," "non-owned network," or the like, refers to one or more networks that share a market with the owned network.

The subject disclosure provides system(s), device(s), and method(s) to enable a subscriber device to report network operation conditions, such as network performance incidents, and to receive feedback from the network related to the incident and available or possibly available solutions. Reporting of network performance incidents can be characterized by location and time of occurrence, wherein this intelligence is provided by the user device. Feedback provided by the network is based on the network performance data received as part of reporting an incident. The reporting described herein enables a network operator to generate intelligence for network planning and for network performance improvement or optimization based on actual network performance as experienced at the subscriber level. Thus, allocation of resources for network optimization and development is based on objective data rather than mainly on simulations or management subjective input or perspective.

One of the various advantages of the subject disclosure is that pushing, or shifting, collection of network performance data to subscribers of a network operator allows the network operator to access network performance more broadly and with higher detail than through conventional approaches. Since the subscribers that report an incident are experiencing the network issue, the subscribers can report the specifics of time, location, details of incident, related events, and environment of the incident that are difficult if not impossible to reproduce by a network engineer dispatched to the location to respond to the reported network performance incident.

Aspects, features, or advantages of the subject innovation can be exploited in substantially any wireless telecommunication, or radio, technology; for example, Wi-Fi, Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA), or LTE Advanced. Additionally, substantially all aspects of the subject disclosure can include legacy telecommunication technologies.

It is noted that while various aspects, features, or advantages of the subject innovation are illustrated through Wi-Fi access point(s) and associated Wi-Fi coverage, such aspects and features also can be exploited in confined-coverage base stations (e.g., home-based access point(s), enterprise-based access point(s)) that provide wireless coverage through most any, or any, disparate telecommunication technologies such as for example femto cell telecommunication or pico cell telecommunication.

Referring to the drawings, FIG. 1A illustrates an example system 100 that enables and exploits reporting of network performance incidents in accordance with aspects described herein. In the subject example system, a set of one or more device(s) 104 can report or provide at least one network performance incident, or "network problem", to a network platform 120 operated by a service operator. The at least one network performance incident is specific to the service provided by the network. In a telecommunication network, the at least one network performance incident can be at least one of a dropped or lost call, no coverage, voice quality issues, etc. In a wireline network, such as a digital cable service, the at least one network performance incident can include poor image quality, unavailability of programming guide, authentication fail instance(s) for pay-per-view programming, or the like. The set of one or more device(s) 104 includes at least one of a mobile device or a wireline device (e.g., customer premise equipment, such as DVR, femtocell access point, Wi-Fi access point, digital television, or the like). A mobile device can be user equipment or any device enabled for wireless communication, such as a cellular telephone; a portable computer (e.g., netbooks or laptops); personal digital assistants (PDAs); a Moving Picture Experts Group (MPEG)-1 Audio Layer 3 (MP3) player; a portable radio tuner (satellite-signal based or conventional); a portable gaming box; or the like. A wireline device can be one of a wireline telephone, a tethered personal computer, a set top box, a television (TV) set, a stereo music player, a tethered radio tuner, a tethered gaming box (e.g., set top box), a digital video recorder (DVR), or the like.

Reporting of a network performance incident can be accomplished through delivery of a report 110 that includes information that specifies the network performance incident, also referred to as incident, and at least one of a location (R) associated with the incident and a time stamp (τ) assigned to the incident. An incident report component 106 functionally coupled to a display interface 108 enable, at least in part, generation and delivery of report 110. Incident report component 106 can receive data from display interface 108 to specify, at least in part, the report. In an aspect, display interface can render various user interfaces that enable collection of input data from an operator of the device that includes incident report component 106, and generates report 110. In addition, in an aspect of the subject disclosure, incident report component can acquire (e.g., receive or retrieve) request(s) for data from display interface 108, where the incident report component 106 delivers such request(s) to feedback system 140 to retrieve, or otherwise access the requested data; display interface 108 can render various user interfaces that enable generating such request(s) and conveying the request(s) to incident network component 106. Moreover, in another aspect, incident network component 106 can generate and deliver requests for data associated with network service(s) (e.g., location-based service, alerting services . . . ) to feedback system 140, and convey data so acquired to display interface 108. Furthermore, in yet other aspects, incident report component 106 can receive instructions to effect specific actions, such as conduct a diagnostic cycle test, or scan a wireless environment in the neighborhood of the device that includes incident report component 106. After completion of such actions, incident report component 106 can deliver the data collected in response to the received instruction to feedback system 140. Several of such aspects will be described in greater detail hereinafter.

In an aspect, the location conveys at least two coordinates (e.g., latitude, longitude), which can be generated at the device, via incident report component 106, through data originated in global navigation satellite system (GNNS), such as global positioning system (GPS), assisted global positioning system (AGPS), Galileo, or GLONNAS (Global'naya Navigatsionnaya Sputnikovaya Sistema or Global Navigation Satellite System), or data acquired from network platform 120 or a network node that provides location-based services and is functionally coupled to network platform 120. In addition, in certain embodiments, R also can convey one or more of altitude, course, horizontal accuracy or vertical accuracy. The report 110, and associated payload, is delivered to the network platform 120 through access network(s) 114, which can be specific to the service for which the network performance incident is reported. In an aspect, the report 110 is delivered as a data message generated by incident report component 106; however, other messaging communications, such as SMS or MMS, also can deliver report 110. For macro-cellular wireless service, access network(s) 114 include a radio access network (RAN) that enables delivery of report 110, whereas for femtocell wireless service, access network(s) 152 can include at least one DSL access multiplexer (DSLAM) and at least one broadband remote access server (B-RAS).

In response to receiving report 110, network platform 120 provides feedback data 150, also referred to as feedback 150. The delivery of feedback 150 can be automatic (e.g., without human intervention). To at least that end, network platform 120 supplies the report 110, and related information, to feedback system 140, which produces feedback 150. In an aspect, gateway (gty) node(s) 124 can acquire (e.g., receive or retrieve) the report 110 and convey it to middleware component 130, which can relay the report 110 to feedback system 140. Middleware component 130 allows functional coupling to and utilization of systems external to network platform or legacy systems.

Feedback system 140 can process network operation data conveyed in reports from various devices and related locations and time stamps, and generate feedback information (e.g., feedback data 150) suitable for a device reporting a network performance incident. In an aspect, analysis component 144 can correlate all or substantially all available data related to network performance incidents from a plurality of customers in a specific area (e.g., metropolitan market) and can access disparate network systems to establish if the reported network performance incident is "new" or recurring. As an example, the network systems can comprise operation layer(s) 160 or external layer(s) 170. Operation layer(s) 170 can include one or more of operation and maintenance (O&M) layers, network-planning layer(s), marketing layer(s), business layer(s), whereas external layer(s) 170 can include vendor layer(s), contractor layer(s), regulation layer(s), or the like. For example, regulation layer(s) can indicate when additional spectrum is available for purchase or free-of-charge utilization. Based on the correlation assessment, analysis component 144 can associate available network planning information to one or more categories of network performance incidents and convey such association to feedback component 148, which can provide (e.g., generate and deliver) feedback data 150. As an example, the one or more categories can include lost or dropped call session; failed call session attempt; absence of coverage; data failure; poor voice quality (e.g., excessive jitter or noise interference); or the like. Feedback data 150 can be received by gateway node(s) 124 in network platform 120, and the gateway node(s) 124 can relay the feedback data 150 to the device that delivered network performance incident report 110.

In an aspect of the subject disclosure, feedback 150 can be delivered to a device in a form of network news in response to delivery of report 110 via, at least in part, incident report component 106. Accordingly, every submission of report 110 can have a "feedback response" from the network operator. Feedback system 140 can deliver the feedback response (feedback 150) through various messaging mechanisms. In an aspect, the feedback response can be a short message service (SMS) communication or a multimedia messaging service (MMS) communication. In another aspect, the feedback response can be a data message incorporated in the incident report component 106 in the device utilized to report the network performance incident. In an embodiment, the incident report component 106 can be a software or firmware application retained as one or more sets of code instructions in a memory within the device utilized to report the network performance incident or in a memory functionally coupled to such device. In such embodiment, feedback system 140 can convey the feedback response (e.g., feedback 150) to the device, which can render the data message as part of execution of the software or firmware application that embodies the incident report component 106.

Feedback 150 can include a message (SMS, MMS, or other data message) that acknowledges reception of report 110. In addition or in the alternative, feedback 150 can supply, through various messaging mechanisms, specific information related to existing network development plans, which can be accessed by feedback component 148 through memory 152 or via operation layer(s) 160 or external layer(s) 170. Content of the information can be tailored to a subscriber in response to additional data included as part of report 110 or data supplied as part of a subscriber feedback mechanism enabled through incident report component 106. In an embodiment, such messaging can be provided initially free-of-charge to subscriber the own or lease a device that includes incident report component 106. Analysis component 144 can track perceived benefit of allowing messaging for those subscribers and based on assessment of the perceived benefit, a network operator that provides service to device(s) 104, can incentivize those subscribers to purchase a recurring network messaging service.

Figure 1B:
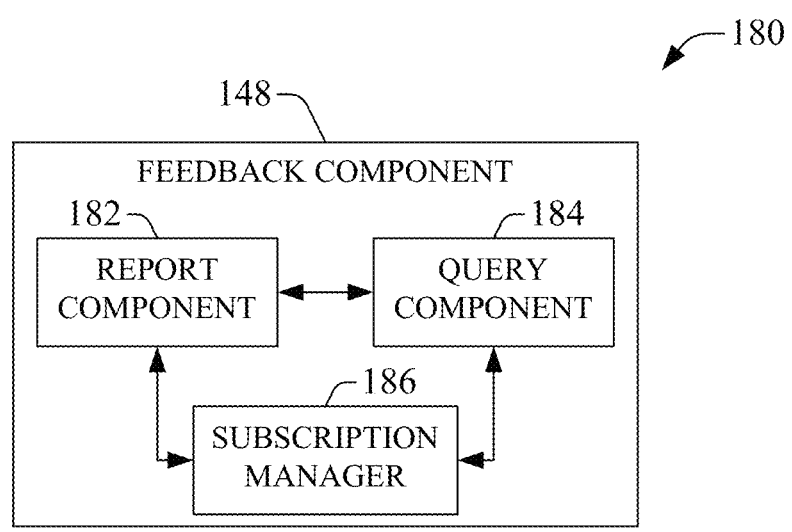
FIG. 1B is an example embodiment of a feedback component that is part of the example system depicted in FIG. 1A.

In an embodiment, e.g., 180 illustrated in FIG. 1B, a report component 182 in feedback component 148 can deliver feedback 150. In an aspect, report component 182 can format the payload data in feedback 150 and can format data that is received as part of network performance incident report 110. In alternative or additional embodiments, feedback component 148 also can include an interactive feedback component (not shown) that can provision, at least in part, an interface to receive, or exchange, feedback interactively amongst a device in the set of one or more devices 104 and feedback system 140.

As indicated supra, information in messages can respond to simple inquiries posed by a subscriber through a device that includes incident report component 106. However, feedback system 140 can provide a feedback response through messaging without receiving an inquiry from the device. For example, for network development plans that include deployment of a base station within a predetermined period (e.g., 60 days), feedback component 148 can deliver a SMS communication or MMS communication to a group of devices that have reported incidents in the area in which the base station is planned to be deployed. Feedback system 140, via analysis component 144, can determine the area to examine for submitted reports based at least on a circle with radius equal or nearly equal to the minimum of (a) the distance to a neighboring base station or the maximum or (b) the maximum typical distance of intended coverage of the base station for a particular morphology. Analysis component 144 can process data on previously submitted reports, e.g., analysis component 144 can filter out duplicate problems per customer. In addition, analysis component 144 can review reports submitted within a predetermined period of time, e.g., 60 days. In an aspect, the group of devices that receive a message should continue to experience difficulties at the time of message delivery, to increase perceived benefit of messaging.

In embodiment 180, query component 184 can manage (receive, format, convey, etc.) any or most any received inquiry from a device or from a network node element, which can be part of operation layer(s) 160, or external layer(s) 170. Subscription manager component 186, also referred to as subscription manager 186, can administer, e.g., create, update, suspend, terminate, subscription related to feedback 150, particularly, though not exclusively, in connection with network news or alerts.

Feedback system 140 can provide feedback 150 in accordance at least in part with the network performance incident that is reported. In an aspect, for an incident related to a "problem noted in a certain area" where the problem is associated with a cell site with an operation issue, the feedback in the form of "news," for example, can be rendered as an alert in the device that delivers the report (e.g., report 110) for the incident and that includes incident report component 106. For instance, the alert can include a message that discloses information that characterizes a course of action aimed to resolution of issues related to the network performance incident that is reported; as an illustration, the message can be "technical difficulties have been noted in the area, and a solution is expected within the next 24 hrs". In another aspect, for network performance incidents reported in an area and related to capacity, feedback system 140 can search for available "capacity augmentation plans" in a database of the service provider; feedback system 140 exploits one or more plans so identified and provides (e.g., issues and delivers) network news as to when capacity additions will be deployed. If the problem reported in an area is related to coverage, and the network operator has coverage improvement plans, then feedback related to the coverage improvement plans can be provided. If the problem reported is related to performance that is not coverage or capacity, and the network operator has performance improvement plans in place, the subject disclosure enables the network operator to convey those plans and ETA via at least network news. If the problem lacks specific known plans for development(s) that can resolve the problem, then the network operator has the ability to create a ticket, and can inform the customer that a ticket has been created and supply related ticket information; in an aspect, the network operator can created the ticket, or service ticket, via, for example, feedback system 140.

In another aspect of the subject innovation, feedback 150 can be supplied to a device within the set of device(s) 106 as part of an alerting service, to which the device can subscribe. The alerting service can provide network development information related to specific area(s); such information can include planned deployments of base stations, addition Subscription to the alerting service can be allowed at a time the device delivers an initial network performance incident report or at a time the device deploys, e.g., installs, builds, and activates, the incident report component 106. To deliver information or content as part of the alerting service, in one embodiment, server(s) 156 can include at least one application server that can extract network alerts or news from a memory or memory element (e.g., a database) in response to a query from a device that subscribes to the alerting service. The query can be received and processed by the at least one application server in server(s) 156. In the alternative, a database manager component (not shown), which can be part of feedback component 148 can receive and process the query. A server or node that is part of operation layer(s) 160, e.g., network and marketing layer, can provide content to the memory or the memory element.

Server(s) 156 can include at least one or more processors (not shown) configured to enable or that enable, at least in part, the functionality of feedback system 140, and components therein. To that end, at least the one or more processors can execute one or more sets of code instructions (not shown) stored in memory 152 (or other computer-readable storage medium), for example. In an aspect, the one or more set of code instructions, when executed by the at least one or more processors (not shown) in server(s) 156 can carry out one or more of the example methods disclosed herein; such code instructions provide a computer-executable or machine-executable framework to enact such example methods and enable at least a portion of the functionality of feedback system 140 described herein. Server(s) also can include an input/output (I/O) interface that enables communication with an external networked apparatus (a device, a server, a memory, etc.). Server(s) 156 can exchange data and signaling, code instructions, directives, and forth, with one or more of analysis component 144, feedback component 148, or memory 152 via bus 157. In addition, analysis component 144, feedback component 148, memory 152, or any combination thereof, also can exchange data and signaling, code instructions, directives, etc. through bus 157. In an aspect, bus 157 can be embodied in one or more of a system bus, an address bus, a message bus, a memory bus, a power bus in accordance with various hardware, firmware, or software implementations.

Figure 2:
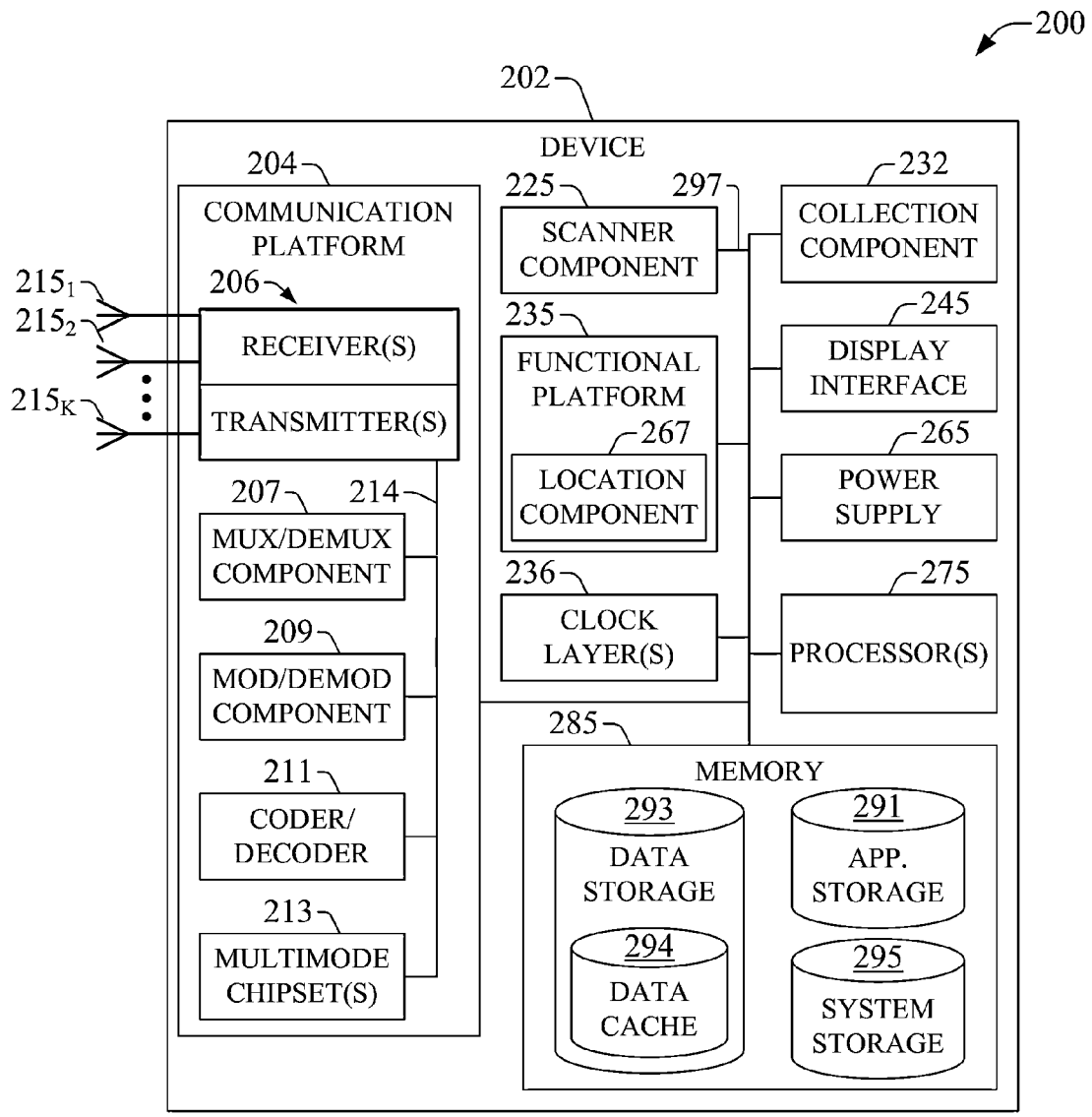
FIG. 2 describes an example embodiment of a device that can report network performance incidents and receive related feedback in accordance with aspects described herein.

FIG. 2 is an example embodiment 200 of a device that enables and exploits various aspects of the subject disclosure. Device 202 can be a mobile device or a wireline device (e.g., a pseudo-stationary or tethered device) that can communicate wirelessly. Device 202 can embody any device that can report a network performance incident through an incident report component (e.g., 106) in accordance with aspects described herein. As an example, collection component 232, location component 267, and scanner component 225 can embody such incident report component. As described supra, in an aspect, collection component 232, location component 267, and scanner component 225 can be retained in memory 285 as one or more sets of code instructions; in such scenario, the incident report component (e.g., 106) is embodied in a software application or firmware application that, when executed by processor(s) 275, provides the functionality described herein. In example, embodiment 200, display interface 245 can embody display interface 245, which can acquire input and provide such input as data or signaling to one or more components of device 202.

To enable wireless communication, and transmit and receive data and signaling wirelessly, device 202 includes a communication platform 204, which comprises a set of receiver(s)/transmitter(s) 206; each transceiver in the set includes an antenna $215_\lambda$, with $\lambda=1, 2, \ldots K$, where K is a natural number greater or equal than unity. One or more of receiver(s)/transmitter(s) 206 can be configured, e.g., by a base station or component(s) therein, to operate in various telecommunication modes: multiple-input multiple-output (MIMO) mode, multiple-input single-output (MISO) mode, single-input single-output (SIMO) mode, or single-input single-output (SISO) mode. Receiver(s)/transmitter(s) 206 include respective filter(s) and amplifiers. The filters are installed between antenna(s) $215_\lambda$ and the amplifier(s), and tune specific portions of electromagnetic (EM) radiation spectrum available for telecommunications.

Communication platform 204 comprises electronic components and associated circuitry that enable processing and manipulation, e.g., coding/decoding, deciphering, modulation/demodulation, of wireless signal(s) received by device 202 and wireless signal(s) to be transmitted by device 202; the wireless signal(s) modulated and coded, or otherwise processed, in accordance with various radio technology protocols. Components, or functional elements, in communication platform 204 exchange information through a bus 214; information includes data, code instructions, signaling, or the like, and the bus 214 can be embodied in at least one of a system bus, and address bus, a data bus, a message bus, or a reference link or interface. The electronic components and circuitry can include the set of K receiver(s)/transmitter(s) 206 and component(s) therein, a multiplexer/demultiplexer (mux/demux) component 207, a modulator/demodulator component 209, a coder/decoder 211, and a set of one or more chipsets, e.g., multi-mode chipset(s) 213. As indicated above, the transceivers includes receiver(s)/transmitter(s) 206 that can convert signal from analog to digital upon reception, and from digital to analog upon transmission. Receiver(s)/transmitter(s) 206 also can divide a single data stream into multiple parallel data streams, or perform the reciprocal operation; such operations typically conducted in various multiplexing schemes. Functionally coupled to receiver(s)/transmitter(s) 206 is a multiplexer/demultiplexer (mux/demux) component 207 that enables processing or manipulation of wireless signal(s) in time and frequency space or domain. Electronic mux/demux component 207 can multiplex and demultiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 207 can scramble and spread information (e.g., codes) according to substantially any code; e.g., Hadamard-Walsh codes, Baker codes, Kasami codes, polyphase codes, and so on. A modulator/demodulator (mod/demod) component 209 also is a part of communication platform 204, and can modulate and demodulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In embodiment 200, mod/demod component 209 is functionally coupled to mux/demux component 207 via bus 214. In addition, processor(s) 275 enables, at least in part, device 202 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Communication platform 204 also includes a coder/decoder 211 that operates on data in accordance with one or more coding/decoding schemes suitable for telecommunication through one or more receivers(s)/transmitter(s) 204. When communication platform 204 exploits MIMO, MISO, SIMO modes of operation, coder/decoder 211 can implement at least one of space-time block coding (STBC) and associated decoding; or space-frequency block (SFBC) coding and associated decoding. Coder/decoder 211 also can extract information from data streams coding in accordance with spatial multiplexing scheme. To decode received information, e.g., data or control signaling, coder/decoder 211 can effect at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. In addition, to operate in the manner described herein, coder/decoder 211 can employ, at least in part, mux/demux component 207 and mod/demod component 209.

A network operator can configure, as part of provisioning of device 202, a set of electromagnetic (EM) radiation frequency bands and a set of radio technologies that communication platform 204 and components therein can exploit for wireless communication. The set of EM radiation frequency bands, also referred to herein as frequency bands, can comprise radio frequency (RF) portion(s) and microwave portion(s) of the EM spectrum, although other spectral regions such as infrared (IR) also can be included. In an aspect, the set of EM radiation frequency bands can include at least one of (i) all or substantially all EM frequency bands licensed by the network operator (e.g., PCS bands, AWS bands, GWCS bands, and so forth); or (ii) all or substantially all unlicensed frequency bands currently available for telecommunication (e.g., the 2.4 GHz Industrial, Scientific and Medical (ISM) band or one or more of the Unlicensed National Information Infra-structure (UNIT) bands in the 5 GHz range). It is noted that as part of network upgrades, the network operator can add frequency bands, or frequency carriers therein, to the set of EM radiation frequency bands as such bands or carriers become available for telecommunication, e.g., auctioned for utilization or authorized for free-of-charge utilization. Similarly, as new radio technologies become standardized, or available, the network operator can introduce such technologies in the set of radio technologies that can be utilized for telecommunication by device 202.

Additionally, in embodiment 200, multimode chipset(s) 213 can allow device 202 to operate in multiple communication modes through various radio network technologies (e.g., second generation (2G), third generation (3G), fourth generation (4G)) or deep-space satellite-based communication in accordance with disparate technical specifications, or standard protocols, for the radio network technologies or satellite communication. In an aspect, multimode chipset(s) 213 can enable, at least in part, communication platform 204 to operate in accordance with standard protocols specific to a telecommunication mode of operation, e.g., 3GPP Long Term Evolution (LTE)-based communication. In another aspect, multimode chipset(s) 213 can be scheduled to operate concurrently (e.g., when K>1) in various modes or within a multitask paradigm in which the multimode chipset(s) 213 operates in a dedicated mode for a specific time interval. In yet another aspect, multi-mode chipset(s) enable communication platform 204 to receive global navigation satellite system (GNNS) pilot signals (e.g., timing message(s), orbit information . . . ) from one or more deployed global navigation satellite systems (GNNSs), as indicated supra.

In an aspect, display interface 245 can receive one or more directives to render an environment (e.g., display one or more user interfaces) to report a network performance incident, and provide data associated therewith, as described supra. In addition, display interface 245 can receive and process (e.g., decode, encode, format, or deliver) data from a subscriber via one or more gestures (e.g., touch, speech, motion). In response to rendering the environment to report the network performance incident, the display interface 245 can receive and process data that specifies a type of network performance incident or a location of the network performance incident; a data entry interface (not shown), and associated circuitry, within display interface 245 can manipulate (e.g., process) a portion of such data (e.g., selection or actuation of a soft-button or other user-device interaction(s)) into data that can be exploited to report the network performance incident. Display interface 245 can deliver the data, either raw or processed, to memory 285 to be retained in memory element 293 or data cache 294. Display interface 245 also can deliver the data to one or more components within device 202 for further processing or delivery to a network platform (e.g., 120).

Further to enabling wireless communication of voice or data, device 202 can provide a specific functionality; for instance, device 202 can be a mobile phone, a photography camera, a video camera, a wireless dedicated computer (such as a device in an industrial environment), a navigation device, a printer or photocopier, a scanner, a fax machine, a television set, a digital picture frame, or the like. Such specific functionality can be supplied primarily through a functional platform 235 that comprises a set of components (not shown) that enable, at least in part, one or more specific functionalities that can complement or supplement wireless communication. It should be appreciated that functional platform 235 can exploit an application (either a software application or a firmware application) retained in application storage 291 in order to provide one or more functionalities of device 202; the application is retained as one or more sets of code instructions. As an example, in an aspect of the subject innovation, application storage 291 can include an application that, when executed, can provide tutorial(s) for operation of device 202. As another example, when device 202 is a telephone, functional platform 235 can include functional elements such as a data entry interface (e.g., a touch screen, a keyboard, a biometric pad for biometric-based access, a microphone, a loud speaker), a camera, peripheral connectors (e.g., a universal serial bus (USB) port or an IEEE 1394 port for transferring data to, or exchanging data with, a disparate device), a voice coder-decoder, which can be part of coder/decoder 211; intelligent component(s) that can respond to voice activated command(s); and so on.

Device 202 also includes various components that enable functionality related to delivery of network performance reports (e.g., report 110). In an aspect, device 202 can acquire (e.g., receive and detect) satellite-based data through a communication platform 204 and can produce, via location component 267, a location estimate of a current location of device 202. In addition, device 202 can perform time-of-flight (TOF) measurements via communication platform 204, a location component 267, and one or more clock layers 236. Timer(s) employed as part of TOF measurements can be enabled by clock layer(s) 236. In certain embodiments, clock layer(s) 236 can implement timing protocols (e.g., Network Time Protocol (NTP)) that enable such timer(s). In one or more embodiments, location component 267 can include components, such as an accelerometer, an altimeter, that can provide additional positional data for the device; for instance, location component 267 can provide altitude of the device or heading.

In another aspect, device 202 includes a collection component 232 that can acquire (receive, retrieve, etc.) data related with an incident report from display interface 245, or data entry interface(s) therein, and supply such data to feedback system 140, via at least in part communication platform 204. Collection component 232 also can acquire data (e.g., from display interface 245) related to requests for service(s) related to reporting of network performance incidents and deliver such data to feedback system 140. As example, collection component can receive from display interface 245 a request for subscription to a network news or alert service, and deliver the request to feedback system 140. As another example, collection component can receive a request for data related to location-based services available to network platform 120; in particular, though not exclusively, location component can convey to collection component 232 a request for a location estimate of ground truth for device 202, and collection component 232 can relay such request to network platform 120, which can access the requested data via feedback system 140 or directly from a network node that provides location-based services.

In another aspect, in response to reporting a network performance incident, scanner component 225 can measure pilot signal(s) within the wireless environment in which device 202 is located and operates. Such functionality is particularly advantageous in cases the network performance incident is reported for indoor operation, since currently available methods to monitor (e.g., measure) indoor radio channel quality or signal strength within building or residences are limited or impractical. As part of delivery of a network performance report (e.g., report 110), device 202 can prompt a customer that owns or leases device 202 to disclose whether the report is being submitted indoor, outdoor or in transit (e.g., traveling). In response to input data associated with such disclosure, collection component 232 can correlate current location with location received as part of the input data (e.g., indoor, outdoor, or in transit) and can determine the signal strength indoors. For example, signal strength, or radio channel quality, inside the customer home can be assessed if the location corresponds to the customer's home address, which is available to the network operator through billing system(s), which can be part of operation layer(s) 160. The data collected through the scan can be conveyed to the network operator, which can utilize the data to calibrate signal strength indoors for the customer that owns or leases the device. In an aspect, scanner component 225 conveys the collected data to communication platform 204, which can deliver the collected data to a network platform (e.g., 120) via an access network (e.g., 114).

At least one advantage of indoor signal strength assessment as described hereinbefore is that signal propagation tools that acquire signal strengths outside of a residence or facility can be calibrated, and thus the network operator can better model or quantify characteristics of in-building propagation loss. In addition, the network operator can generate or update "per subscriber" model(s) of attrition vulnerability originated in poor signal quality indoor; in an aspect, analysis component 144 can generate or update such model(s).

Scanner component 225 also can enable "auto-troubleshooting" features. To at least that end, scanner component 225 can monitor operation of device 202 and execute diagnostic cycle(s) (or diagnostic test run(s)) that can allow optimization of performance of device 202. In an aspect, execution of the diagnostic cycle(s) conducts one or more data tests directed to assess, or characterize, one or more of latency (e.g., roundtrip latency of a data packet) or data rate (or speed). In another aspect, such diagnostic cycle(s) can be performed in response to specific network performance incidents such as data failure. Data collected as part of the diagnostic cycle(s) can be delivered to the network operator instead of rendered in device 202. For example, peak upload and peak download speeds, or data rates, can be recorded in a diagnostic table database in memory 152. Additionally, in certain embodiments, for a subscriber in a specific segment of subscribers (e.g., employees of network operator), a predetermined code associated with the subscriber can be received in the device and, as a result, the device validate the predetermined code and, if valid, the device can modify behavior of or add functionality to diagnostic test run(s)— the modified behavior or added functionality is said to be unlocked by the predetermined code. Part of the modified behavior or added functionality can enable the device 202 to render the results of the diagnostic test run(s). In an aspect, throughput, speed or data rate, and peak speed or peak data rate can be rendered, via display interface 245 if device 202 receives and validates the predetermined code. In addition, as part of the modified behavior or added functionality, scanner component 225 can implement loop diagnostic test(s) that can probe performance of device 202 in cycles until the device 202 receives an indication to terminate the loop diagnostic test(s). The modified behavior or added functionality remains unlocked during the time interval that device 202 renders and environment to report a network performance incident. After the device 202 ceases to render the environment, the modified behavior or added functionality of diagnostic cycles is to be unlocked if desired.

In an example scenario related to diagnostic cycle(s), if a customer that owns or leases device 202 submits a "data problem" on a first radio technology (e.g., 3GPP UMTS), scanner component 225 can perform a diagnostic cycle, e.g., an "auto-checking" loop, and detect that a second radio technology (3GPP LTE, Wi-Fi, femtocell, picocell, etc.) is operating adequately. Adequate operation can be determined through comparison of a key performance indicator (KPI) or performance metric and a related predetermined threshold; KPI or performance metric above the predetermined threshold indicates adequate operation. As a result of the diagnostic cycle, and identification of second technology as adequate, scanner component 225 can deliver an indication to render a message that advises a specific action to be performed by the customer that owns or leases device 202. Display interface 245 can receive the indication and render the message. As an example, the message can suggest the customer to switch to the second radio technology—in particular, though not exclusively, the message can suggest considering connecting to an open Wi-Fi AP (or hotspots) in proximity of the device 202. It should be noted that as part of the diagnostic cycle, scanner component 225 can check the at least one Wi-Fi AP for adequate operation prior to issuing such a message. In addition or in the alternative, in response to the diagnostic cycle and related findings, scanner component 225 can switch to the second radio technology without customer intervention (e.g., automatically); e.g., scanner component 225 can signal reconfiguration of multimode chipset(s) 213 in order to operated in the second radio technology that has been identified as operating adequately.

In the absence of wireless service, a report (e.g., 110) of a network performance incident can be queued for delivery after the wireless service resumes. In the illustrated embodiment, collection component 232 can acquire wireless coverage condition and queue a submission of a report of a network performance incident if the wireless coverage condition reveals wireless service is unavailable. To acquire wireless coverage condition, collection component 232 can poll a memory register that contains service status when (e.g., at the time) an indication to submit a report is received from display interface 245; the memory register can be part of system storage 295 in memory 285. In case the wireless coverage condition indicates that service is unavailable, collection component 232 can continue to poll the memory register, either periodically or according to a predetermined schedule; collection component 232 delivers the report, via communication platform 204, for example, if the polling extracts a wireless coverage condition that reveals wireless service has become available.

Display interface 245 can embody display interface 108 and can render visual or aural indicia that control functionality of device 202 as supplied through functional platform 235, or reveal operational conditions of device 202; for example, battery level, radio technology employed for communication, or the like. In addition, display interface 245 can render various graphical user interfaces that enable data input associated with reporting a network performance incident; in particular, though not exclusively, display interface 245 can render at least the example user interfaces described in the subject disclosure (e.g., FIGS. 3A-13C).

Device 202 includes processor(s) 275 configured to enable or that enable, at least in part, functionality of substantially any or any component(s) or platform(s), interface(s), and so forth, within device 202 in accordance with one or more aspects of the subject disclosure. In example embodiment 200, processor(s) 275 is illustrated as external to the various functional elements (e.g., component(s), interface(s), platform(s)) of device 202; however, in additional or alternative embodiments, processor(s) 275 can be distributed amongst a plurality of such various functional elements. Processor(s) 275 is functionally (e.g., communicatively) coupled to each functional element within device 202 and to memory 285 through bus 295, which can be embodied in at least one of a memory bus, a system bus, an address bus, a message bus, or one or more reference link(s) or interface(s). In addition, processor(s) 275 can supply information to and retrieve information from memory 285, wherein the information can enable, at least in part, operation and/or can provide, at least in part, functionality to communication platform 205 and at least a portion of component(s) therein; scanner component 225; collection component 232; display interface 245; clock layer(s) 236; functional platform 235 and component(s) therein; as well as other operational components (not shown) of device 202. The information can include at least one of code instructions, code structure(s), data structures, or the like.

Processor(s) 275 can execute code instructions stored in memory 285 to provide or to enable the described functionality of device 202; the code instructions can be retained within application storage 291, system storage 295, or other memory(ies) functionally coupled to device 202. Such code instructions can include program modules or software applications or firmware applications that, when executed by processor(s) 275, implement various methods described in the subject disclosure and that are associated, at least in part, with described functionality of device 202 in connection with supplying a report of network performance incident(s).

Memory 285 can retain, at least in part in an application storage 291, at least one of data structures (e.g., objects, classes, metadata); code structure(s) (e.g., modules, procedures) or instructions; or substantially any type of software application or firmware application that processor(s) 275 can execute to provide functionality associated with substantially any or any component(s), platform(s), interface(s), or functional element(s) within device 202 in accordance with aspects of the subject disclosure. In addition, memory 285 can store network or device information, e.g., within data storage 293, such as encoded pilot signal(s); one or more communication protocol(s) or technical specification(s); code sequences for scrambling or spreading; blind decoding hypotheses; semi-persistent scheduling parameters; frequency offsets, macrocell and femtocell identifiers (IDs); address book(s); or the like. Moreover, memory 285 can retain content(s) such as multimedia files or subscriber-generated data; security credentials (e.g., passwords, encryption keys, digital certificates, biometric keys such as voice recordings, iris patterns, fingerprints, deoxyribonucleic acid (DNA) profiles); hardware identifying tokens or codes such as at least one of an international mobile subscriber identity (IMSI), a temporary mobile subscriber identity (TMSI), packet TMSI (P-TMSI), an international mobile equipment identifier (IMEI), an a mobile directory number (MDN), a mobile identification number (MIN), a Telecommunications Industry Association (TIA) electronic serial number (ESN), or a multi-bit identification number such as mobile identity number (MEID). It is noted that memory 285 can include affixed or removable elements such as a subscriber identification module (SIM) card storage, a universal integrated circuit card (UICC) storage, or a removable user identity module (RUIM).

Device 202 also includes power supply 265, which can provide power to one or more components or functional elements that operate within device 202. In an aspect, power supply 265 can be rechargeable, e.g., it can be embodied in a rechargeable battery. In addition, power supply 265 can include one or more transformers to achieve power level(s) that can operate device 202 and components or functional elements, and related circuitry therein. In an aspect, power supply 265 can attach to a conventional power grid to recharge, or ensure device 202 is operational; power supply 265 can include input/output (I/O) interface(s) (not shown), or connector(s) (not shown), to functionally attach to the conventional power grid. Power supply 265 also can include an energy conversion component(s) (not shown) such as a solar panel or a thermoelectric device or material, which can be external or internal to the device 202, in order to provide additional or alternative power resources or autonomy to device 202.

Figure 3A:
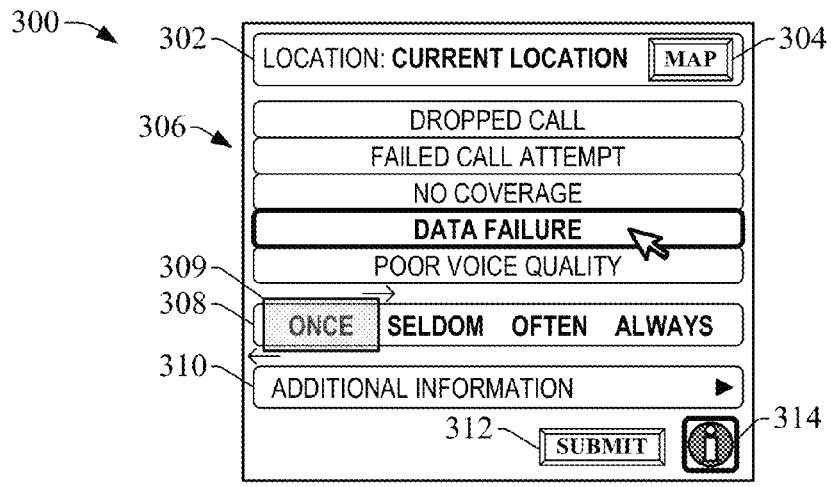
FIGS. 3A-13C present various example user interfaces that allow a device, wireless or otherwise, to enable various aspects of the subject disclosure.
Figure 3B:
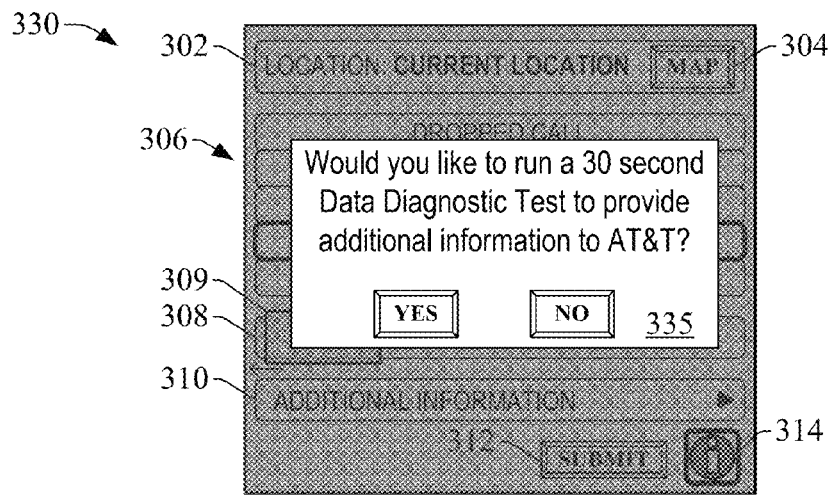

FIGS. 3A-13C present various user interfaces that can be rendered by a device (e.g., user equipment or customer premise equipment) that enables various aspects of the subject innovation. In FIG. 3A, example user interface (UI) 300 enables reporting of various network performance incidents for a specific location. Indicia 302 conveys the specific location; e.g., "Current Location". The device that renders UI 300 can determine, or estimate, the "Current Location" based at least on global navigation satellite system (GNNS) data or time-of-flight (TOF) measurements, as described supra. In addition or in the alternative, soft-button 304 allows, when actuated, supplying the specific location on a map; soft-button 304 can be actuated through various gestures (speech, touch, motion, etc.). In one or more embodiments, the map can be rendered and positioned based at least in part on an address search. A group of indicia 306 represents a set of incidents that can be reported: Dropped Call, Failed Call Attempt, No Coverage, Data Failure, and Poor Voice Quality. It should be appreciated that other incidents can be reported. Moreover, the network performance incidents represented by the group of indicia 306 are specific to incidents in telecommunication; incidents related to network performance for other services, such as recording of digital content, pay-per-view service, internet service, etc., can be represented by a disparate set of indicia. In an aspect of the subject disclosure, a group of identifiers conveyed in indicia 308 enables characterization, or assessment, of frequency of the network performance incident: A selector block 309 (e.g., a slider) can be utilized via a finger swipe or other gesture (voice, motion, etc.) to select one identifier from the group of "Once", "Seldom", "Often" "Always". It should be noted that such identifiers are illustrative and other identifiers can be defined and exploited to assess frequency with which a network performance incident occurs.

Indicia 310 enables supplying additional information that further characterizes the network performance incident. The additional information can include comments related to the network performance incident or its environment. In addition, in one or more embodiments, indicia 310 can allow rendition of information, e.g., views, related to reporting of network performance incidents. As an example, a view that discloses all incidents reported by the device that renders example UI 300 can be rendered in response to actuation of one or more soft-buttons (not shown) that is part of indicia 310; rendition of such view can be responsive to configurable filter settings. As another example, a view that conveys operation details of a particular incident, current or historical, can be rendered in response to actuation of a soft-button (not shown) that is part of indicia 310.

Soft-button 312, when actuated, enables delivery of a report of a network performance incident. Support information for utilization of UI 300 to report a network performance incident can be rendered through a disparate UI (not shown) in response to actuation of soft-button 314. As an example, selection of incident indicia in group 306 (e.g., one of "Dropped Call", "Failed Call Attempt", "No Coverage", "Data Failure", or "Poor Voice Quality", and actuation of soft-button 314 can result in rendition of information that explains the nature of the network performance incident represented by the incident indicia. In diagram 300, selection of "Data Failure" soft-button is represented with an open, slanted arrow. As another example, actuation of soft-button 314 can render content that explains information that is available through user interface 300 or UI(s) derived there from. In addition, in certain scenarios, as part of the support information, the disparate UI (not shown) rendered in response to actuation of soft-button 314 can enable delivery of data that identify a preferred Wi-Fi AP and nominate the Wi-Fi AP to be part of a network of Wi-Fi APs, the data delivered to a network platform of a telecommunication carrier or service provider. For example, in such scenarios, the data can be delivered via email, where the disparate UI includes a link to a specific email address that when selected causes the device (e.g., 202) that renders the disparate UI to execute an email message delivery application; in device 202 such application can be retained in application storage 291.

Figure 3C:
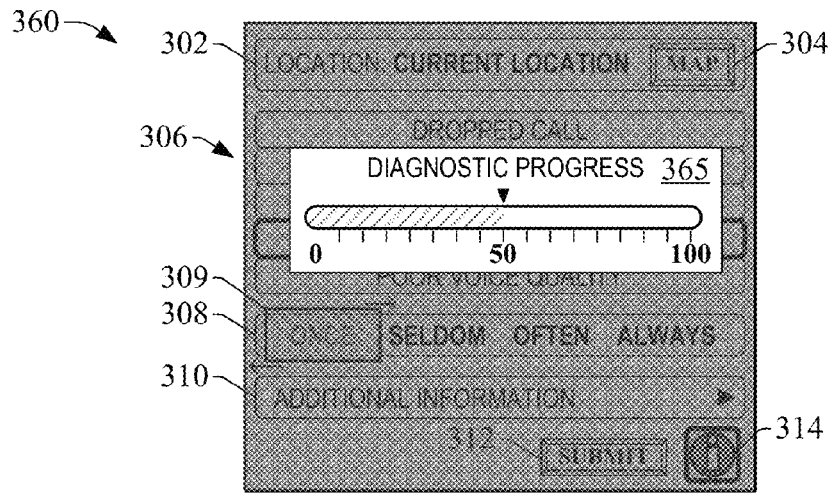

As discussed supra, the device that renders example UI 300 can perform a diagnostic cycle in response to a "Data failure" network performance incident. In one example implementation, as presented in FIG. 3B, a subscriber can be prompted through a user interface 330 to perform the diagnostic cycle in response to reporting data failure through actuation (indicated with an open arrow) of "Data Failure" soft-button in FIG. 3A. The prompt can be accomplished through rendition of indicia 335 that request input from the user device that renders example UI 300; rendition of such indicia can include darkening (indicated with a grey, shadowed area) of the various soft-buttons of example UI 300. Upon acceptance to perform the diagnostic cycle, which can be conveyed through actuation of a "Yes" soft button, the diagnostic cycle is performed and a user interface 360, in FIG. 3C, is rendered to indicate the diagnostic cycle is being conducted; indicia 365 in UI 360 conveys progress of the diagnostic cycle. Data collected as part of the diagnostic cycle is delivered to the network operator. It should be appreciated that other user interfaces and related indicia can be employed to prompt for acceptance of a diagnostic cycle and to convey progress of such diagnostic.

Figure 4:
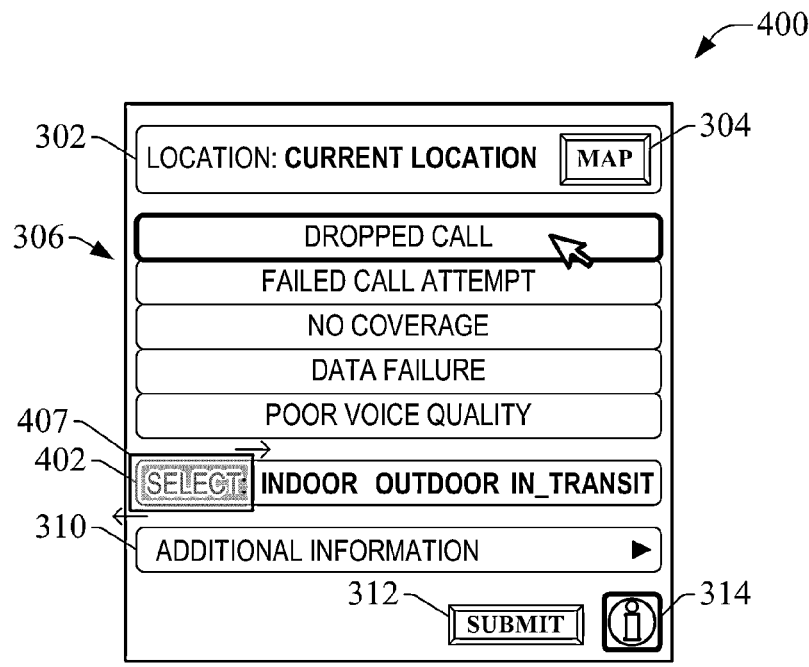

FIG. 4 presents an example UI 400 that illustrates a group 402 of indicia that enables categorization or characterization, at least in part, of a "Dropped Call" incident (selection highlighted with a thick line in group 306). Identifiers in the group 402 of indicia include "Indoor", "Outdoor", and "In_Transit", and are selected via block 407 (e.g., a slider block), which can be manipulated within the UI 400 through a pressure-sensitive gesture (finger swipe) or other gestures. Manipulation includes lateral motion (indicated with arrows in the drawing) across the various identifiers; manipulation can be accompanied by aural indicia. While block 407 is illustrated as a semi-transparent rectangle, other representations can be employed such as wire-frame block or a block that highlights an identifier when moved onto the identifier. Such characterization is delivered as part of network operation data within a report (e.g., report 110) of the network performance incident.

Figure 5:
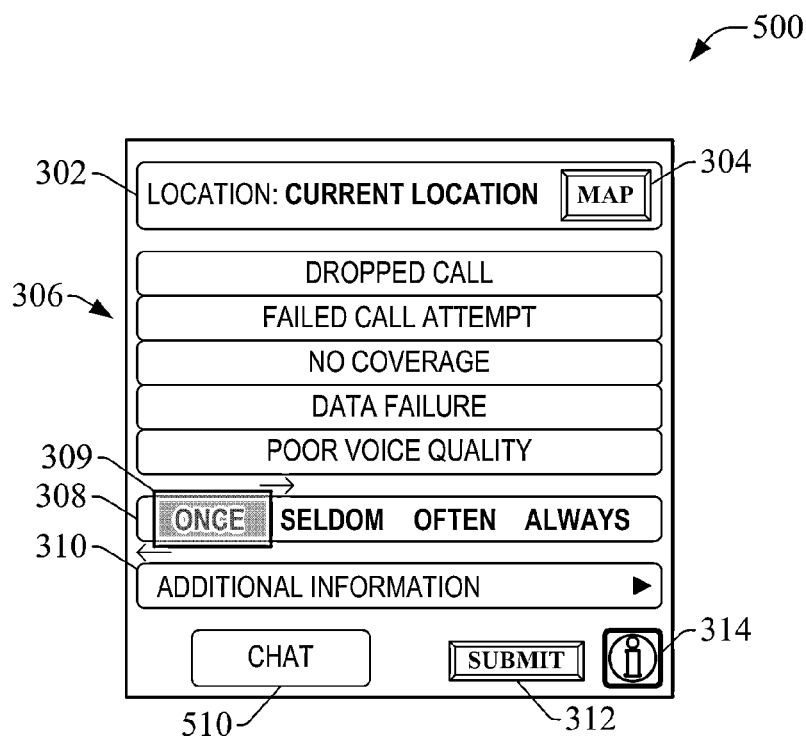

FIG. 5 presents an example UI 500 that can enable interactive delivery of feedback associated with a network performance incident. When actuated, a soft-button 510 renders a user interface through which a chat-room communication can be established with a customer service representative of the network operator. In an aspect, when soft-button 510 is actuated, the device (e.g., 202) that renders UI 500 can deliver a request to initiate an interactive feedback exchange with a feedback system (e.g., 140). In response to the request, the device can be provisioned an interface to conduct an interactive session for exchanging information. The device renders the provisioned interface and exchanges data with the feedback system.

Figure 6A:
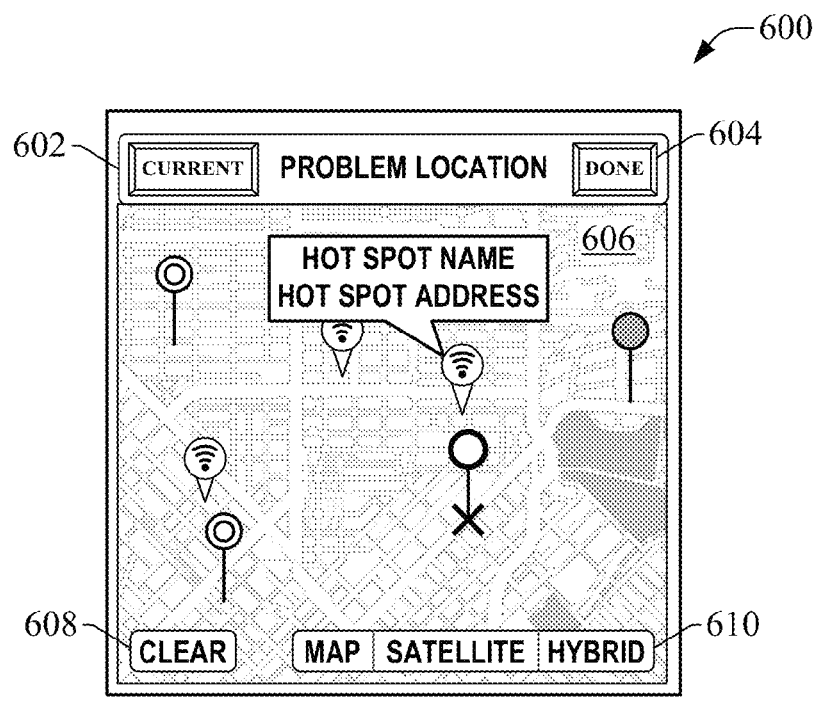
Figure 6B:
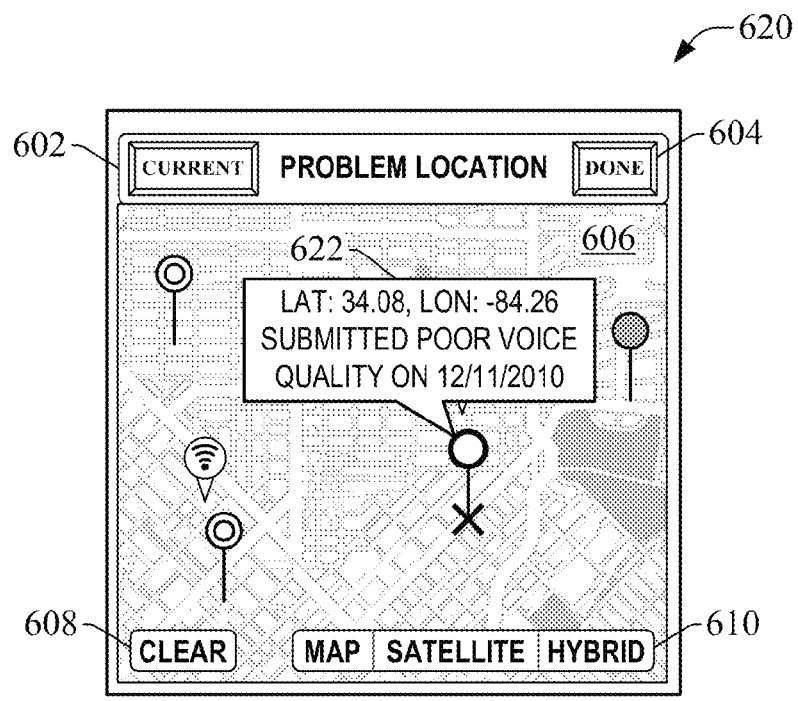

In FIG. 6, an example UI 600 conveys location of a network performance incident in a map. The device (e.g., device 202) that renders example UI 600 can retrieve the map from a server that is part of a network platform (e.g., 120) of the network operator or an external network functionally coupled to the network platform (e.g., 120) and that provides location-based services. In an aspect, the device can retrieve exploit a collection component (e.g., 232) and a communication platform (e.g., 204). A block 602 of indicia allows determination of the incident location through actuation of a "Current" soft-button; such determination can be made in accordance with satellite-based data (e.g., GNNS data) acquired by the device that renders example UI 600 or TOF measurements performed by the device, as described supra. In map 606, the estimated location of the network performance incident is presented as a pin connected to a cross; other indicia can be employed as well. In an aspect, the specific position of the pin and linked cross can be altered through one or more gestures, such as pressure-sensitive gestures, which can include finger swipes or finger movement while in contact with a surface of a display in the device (e.g., 202) that renders the example UI 600. Such mode of providing a specific location for the network performance incident can be activated through selection of "Map" in the block 610 of indicia, which enables various sources of location estimates. For example, selection of "Satellite" causes the device that renders example UI 600 to estimate a current location based on GNNS data, whereas selection of "Hybrid" provides a location estimate based on a combination of a selection on the map 606 and GNNS data. In one or more embodiments, a "tracking mode" for the current location can be enabled, wherein the pin and the cross connected thereto moves within a rendered map (e.g., 606) as the current location changes; thus, the location of the device that renders example UI 600 can be followed as the device moves in real space. The rendered map (e.g., 606) positions itself as the current location changes. In an aspect, the "tracking mode" can be activated if an "In_Transit" selection is effected. In another aspect, the "tracking mode" can be activated if a dedicated soft-button (e.g., "Tracking Mode" button; not shown) in block 610 is actuated.

In addition, location(s) for which data that specifies a network performance incident is queued can be conveyed in a rendered map that includes location of the network performance incident; as an example, such location(s) are represented as grey-pins in map 606. Other indicia also can be employed to convey location(s) for a queued submission. Location(s) of previously reported network performance incidents also can be included in a rendered map that includes location of a network performance incident; as an example, in map 606, a pin with a concentric circle can indicate location(s) of historical network performance incident(s) and related report submission(s). In an aspect, in example UI 600, a "Clear" soft-button 608 can remove from the map one or more location(s) of previously reported network performance incidents. Other indicia also can be employed to convey such location(s). Moreover, a set of open or semi-open confined-coverage access points (e.g., Wi-Fi APs, femtocell APs . . . ; represented with a circle with three arcs and a dot) also can be displayed in the map 606. A confined-coverage access point (AP) is generally deployed as part of a private or semi-private dwelling; the confined-coverage AP provides wireless coverage to a confined area owned or leased by the owner or lessee of the confined-coverage AP, where the confined-area can encompass the private or semi-private dwelling. Disclosure of location of a confined-coverage AP can guide a subscriber to areas of possible interest, e.g., coffee-shop, health club, public library.

In one or more embodiments, such as example UI 620, a disclosure indicator 622 can be rendered on top, or otherwise attached to, of a pin linked to a location to convey coordinates of the location (e.g., latitude, longitude) and details of a report (e.g., type of report, date of report . . . ) that has been submitted for the specific location identified by the pin. While illustrated for a current location pin in example UI 620, the disclosure indicator 622, and pertinent coordinates of location and details of a report can be rendered for any other pin (e.g., queued location, past submission location) that is rendered in UI 620.

In additional or alternative embodiments, a soft-button (not shown) can be included in example UI 600 to display, when the soft-button is actuated, cell tower (or macrocell base station) locations in a map (e.g., 606) and characterize such cell towers according to the radio technology (e.g., 2.5G, 3G, 3.5G, 4G . . . ) that the cell towers employ to serve wireless service. In addition, further actuation of the soft-button can render location(s) of planned cell tower construction locations. In an aspect, a collection component (e.g., 232) in the device (e.g., 202) that renders the cell tower locations, deployed or planned, can receive from a display interface (e.g., 245) an indication to query feedback system 140 and request available information on deployment, current or planned, for macrocell base stations or any other type of access point.

Figure 7:
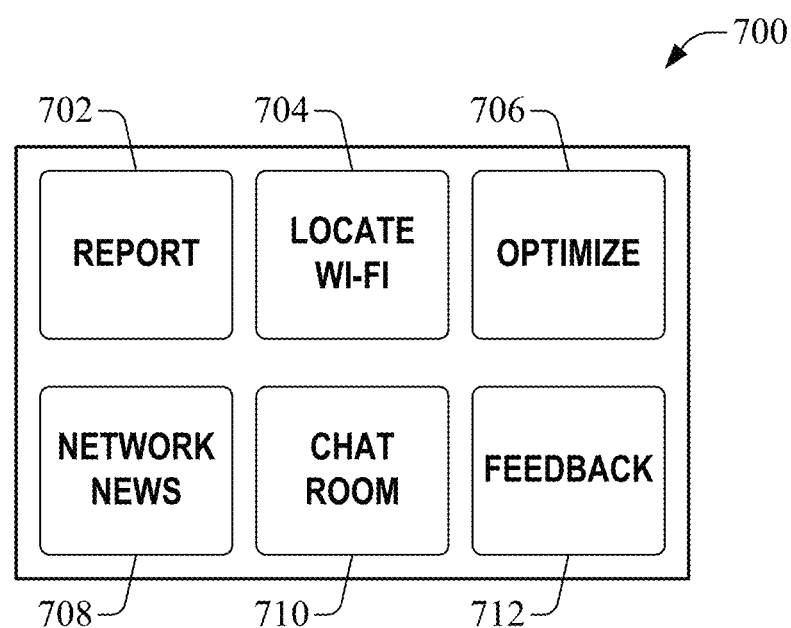
Figure 8:
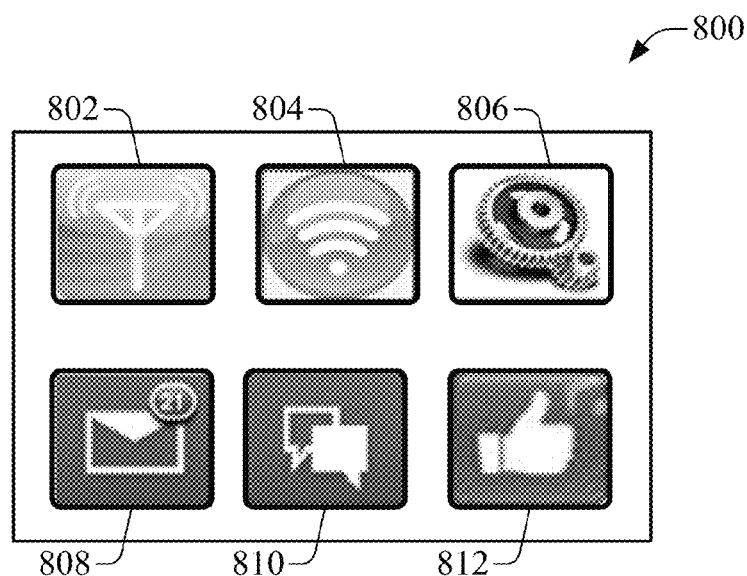

FIG. 7 presents an example UI 700 that can be rendered as landing page after an application (software or firmware) that allows to report a network performance incident is executed. A device that render example UM 700 can execute the application. As illustrated, example UI 700 includes a set of soft-buttons arranged in six-pack format; when actuated each soft-button provides results in rendition of additional user interface(s) that enable, at least in part, specific functionality. FIG. 8 conveys a specific example graphic representation of the set of soft-buttons; icons that represent soft-buttons 802-812 in diagram 800 are spatially arranged in a one-to-one correspondence with blocks that represent soft-buttons 702 through 712 in example UI 700. Namely, soft-button 802 corresponds to soft-button 702; soft-button 804 corresponds to soft-button 704; soft-button 706 corresponds to soft-button 806; soft-button 810 corresponds to soft-button 710; soft-button 812 corresponds to soft-button 712. In particular, though not exclusively, example UI 700 includes a "Report" soft-button 702 that enables supplying data that specifies a network performance incident. For example, actuation of soft-button 702 can render example user interface such as 300, 400 or 500. In addition, example UI 700 includes a "Locate Wi-Fi" soft-button 704 that, when actuated, affords identifying Wi-Fi AP(s) or other confined-coverage APs in proximity to the device that renders example UI 700. Example UI 700 also includes an "Optimize" soft-button 706 that, when actuated, enables optimization of or otherwise adjustment to operation conditions of the device that executes the application that allows to report the network performance incident. Moreover, example UI 700 includes a "Network News" soft-button 708 that, when actuated, enables access to feedback information (e.g., feedback 150) from the network operator that provides the service for which the network performance incident is reported. In an aspect, the feedback information includes Network Improvement alerts, which can be alerts directed to general improvements or to improvements specific to an area customized to a subscriber that utilizes the device that renders example UI 700. A number of network news or network alerts can be rendered as part of soft-button 708, see e.g., soft-button 808 which presents an example realization of such number ("21"). Furthermore, example UI 700 includes a "Chat Room" soft-button 710 that, when actuated, enables interactive exchange of information with a network representative as described supra. Still further, example UI 700 includes a "Feedback" soft-button 712 that, when actuated, provides one or more user interfaces to deliver supplemental information related with a reported incident or feedback linked therewith. In addition, soft-button 712 can enable, when actuated, delivery of other information such as identification of a confined-area AP (e.g., Wi-Fi AP) and nomination of the confined-area AP to become a part of a network of confined-area APs administered by the network operator that provides the service for which the network performance incident is reported. Moreover, when actuated, soft-button 712 allows the device that render example UI 700 to submit specific inquiries to the network operator and to receive related feedback or responses there from. It should be readily appreciated that the set of soft-buttons is extensible and can be modified to add soft-buttons that allow additional functionality. For example, a soft-button can be added to enable, at least in part, interactive or non-interactive exchange of information with peer-devices (or subscribers that own or lease such devices) as a result of actuating the soft-button.

Figure 9:
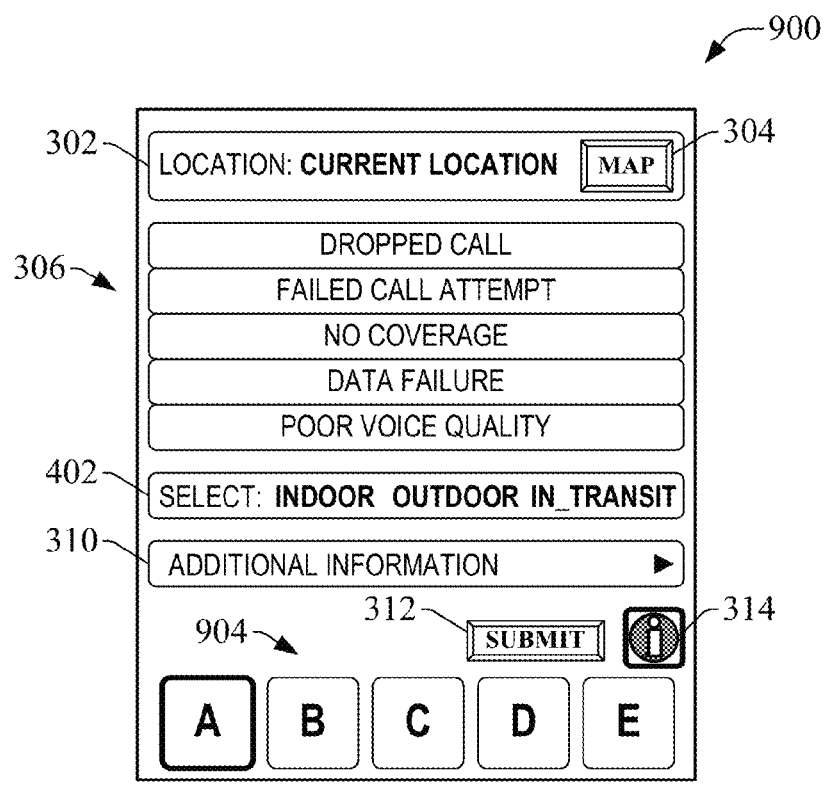
Figure 10:
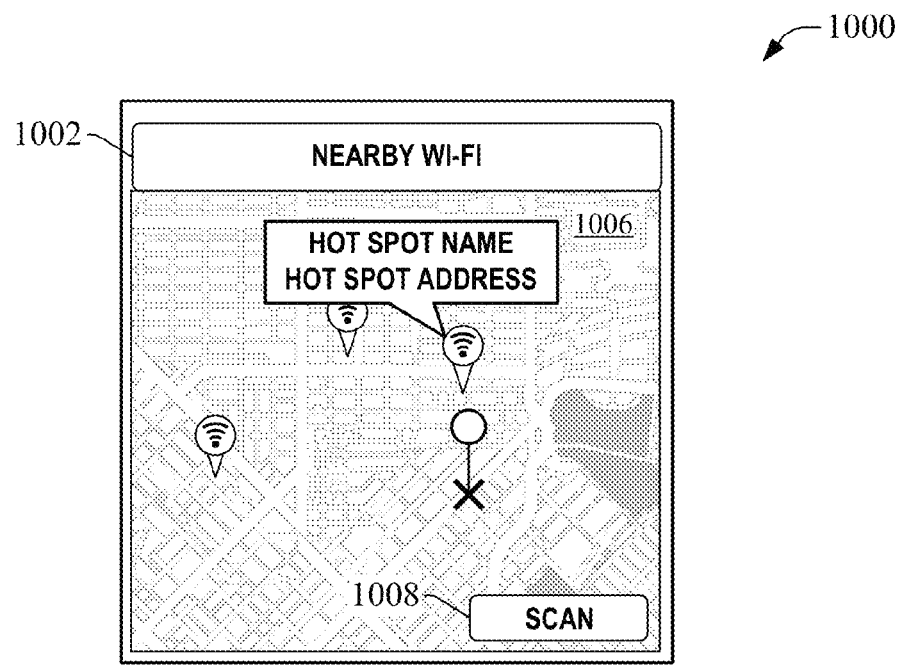

FIG. 9 displays an example UI 900 that results from actuating soft-button "A" in a set of soft-buttons 904 that enables various functionalities; the set of soft-buttons 904 is an additional or alternative representation of the set of soft-buttons rendered in example UI 700. Such representation can be a carousel representation, which can be browsed through pressure-sensitive gestures (e.g., finger swipes). As illustrated, soft-button "A" renders a user interface to report a network performance incident. Likewise, FIG. 10 illustrates an example UI 1000 that is rendered in response to actuation of soft-button "B" in the set of soft-buttons 904; such UI enables locating one or more Wi-Fi APs, or any confined-coverage AP, in proximity to the device that executes the application that enables reporting of network performance incident(s). In one or more embodiments, the application is either a software application or a firmware application stored in a memory in the device, and embodies an incident report component (e.g., 106), or one or more component(s) therein. As illustrated, in example UI 1000, a "Scan" soft-button 1008 triggers measurement of various pilot signals that can identify one or more Wi-Fi APs or confined-coverage APs. The measurement can be performed by the device that renders the user interface; in one or more embodiments, a scanner component (e.g., 225) in such device can scan the wireless environment of the device and obtain data on the various pilot signals and, based on the data, identify the set of Wi-Fi APs or other confined-coverage APs. In addition or in the alternative, actuation of "Scan" soft-button 1008 can result in collection from data storage (e.g., a phonebook database) in the device or from a network node (e.g., a database) of deployment data or availability data for Wi-Fi APs near (e.g., at a distance of one or more typical coverage radius of a Wi-Fi AP) a current location of the device (e.g., R). Data on availability of Wi-Fi APs, or any other confined-coverage APs, can be embodied in data that identify a Wi-Fi AP or any other confined-coverage AP and can be retained in the data storage within the device.

Figure 11:
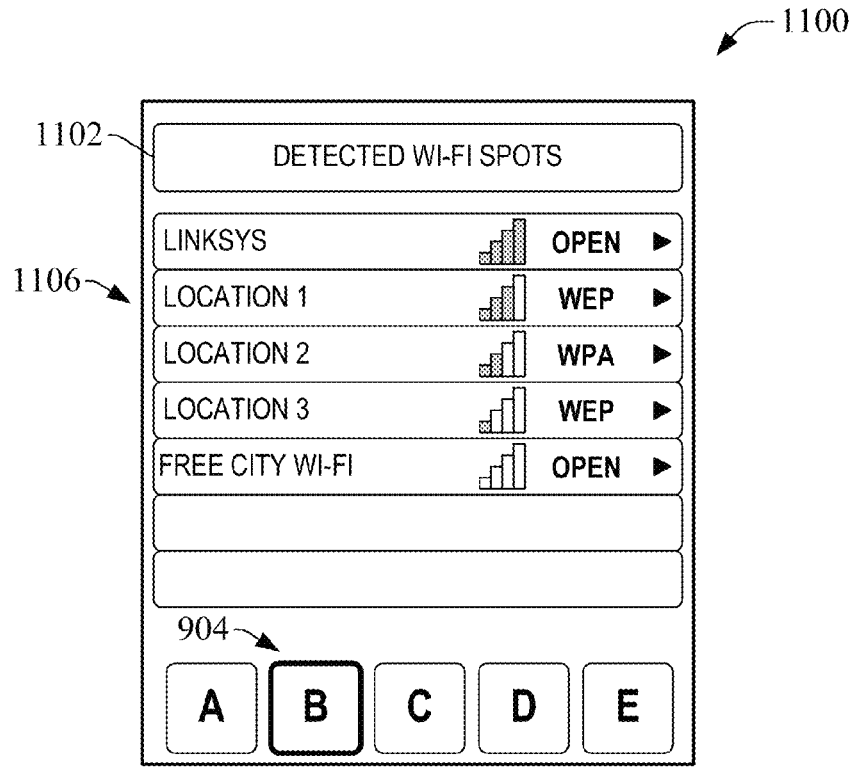

FIG. 11 presents an example UI 1100 that conveys a set of Wi-Fi APs, or any other type of confined-coverage APs, that are identified as a result of scanning the wireless environment of the device or by retrieving (e.g., downloading) location data on Wi-Fi AP. As illustrated, open Wi-Fi APs, Wi-Fi Protected Access (WPA) Wi-Fi APs, and WEP (Wired Equivalent Privacy) Wi-Fi APs can be identified. In certain embodiments, in addition to privacy or protection indicators for the Wi-Fi AP(s) other indicators that characterize the Wi-Fi AP can be rendered in a user interface or can be recorded in a memory (e.g., 285) in the device that renders example UI 1100 or other UI that conveys a list of Wi-Fi APs. For instance, the indicators that can be stored or rendered include received signal strength indicator (RSSI), service set identifier (SSID), basic service set identifier (BSSID), radio frequency (RF) Channel, medium access control (MAC) Address, or Protection configuration (Open, WEP, or WPA presented in example UI 1100). Actuation of a soft-button in the set of indicia 1106 can render a UI that allows connection to the Wi-Fi AP identified in the soft-button (e.g., "Location 2" Wi-Fi AP). If the device that renders the UI that allows such connection receives an indication to connect to the identified Wi-Fi AP, the device can execute a connection manager application (software or firmware) that can reside in the device, in memory element 291 in device 202. If the device connects to the identified Wi-Fi AP, the device can render an additional soft-button that, when actuated, enables the device to record data that identifies the Wi-Fi AP within data storage (e.g., 293) in the device (202). In an aspect, the device that renders UI 1100 can automatically connect or attempt to connect to one or more Wi-Fi APs that are identified in data storage, such as in a phonebook database, within such device.

Figure 12:
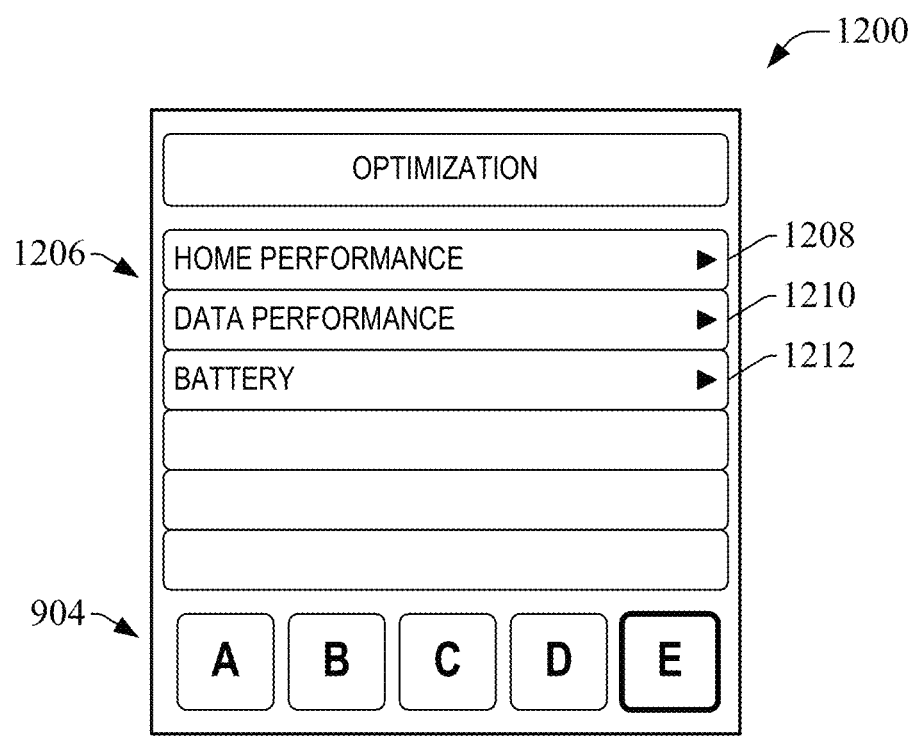

Actuation of soft-button "E" renders example UI 1200 in FIG. 12. Various aspects of device performance optimization can be enabled, as illustrated by the group of indicia 1206. Actuation of a soft-button in the group of indicia 1206 can result in additional user interface(s) being rendered. Such UI(s) can allow exchange of data related to operation of the device (e.g., 202), the data being specific to performance that is intended to be optimized: For example, home performance, data performance, or battery. Actuation of "Home Performance" soft-button 1208 or "Data Performance" soft-button 1210 can result in data collection as described supra. For example, for "Home performance" a query-response UI can be rendered to convey a set of questions related to such performance: (1) "Can you make calls everywhere with good quality at home"; (2) "Do you have high-speed internet at home?" "If yes, do you have Wi-Fi at home?"; and (3) "Do you have a 3G Microcell at home? Based on the collected responses, the device (e.g., 202) that renders example UI 1200 and the query-response UI (not shown) can render additional user interface(s) to provide guidance (e.g., a "tip") to improve network performance associated with the reported incident. The guidance can be provided as a message, which can include a web-based link to details related to implementation of the guidance.

Actuation of "Battery" soft-button 1212 also can result in data collection that probes operation condition of an existing battery within the device that render the example UI 1200. In addition, such actuation can render at least one user interface that conveys battery options available for purchase from the network operator or one or more vendors; the at least one user interface can include a link to a web-based interface (e.g., webpage) in which the purchase can be conducted. Moreover, the at least one user interface can convey alternative operation configurations for the device that are directed to improving battery performance, such as executing a monitoring cycle that adjusts backlighting intensity in the device's display(s) based on environment in which the device operates.

Figure 13A:
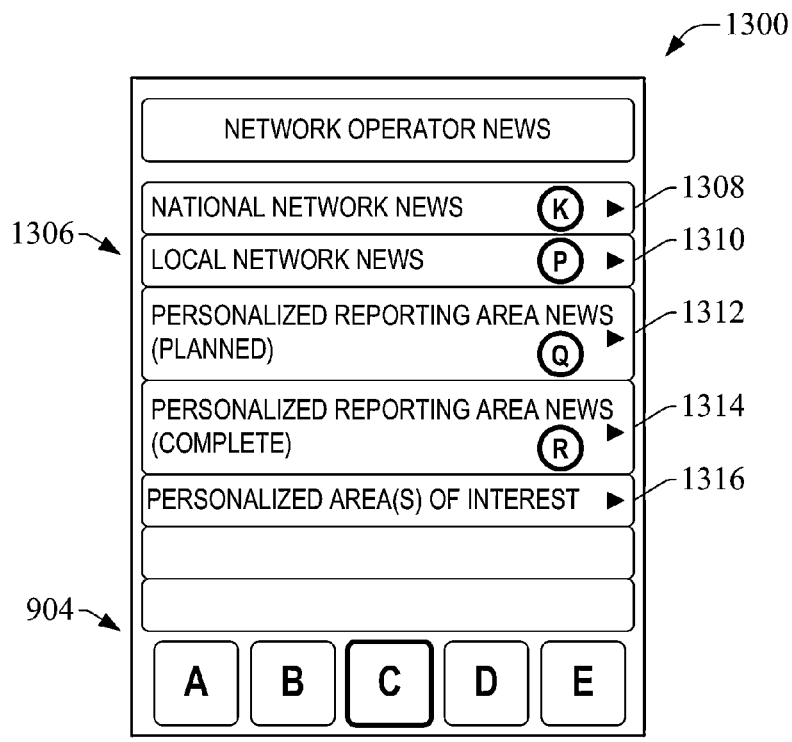
Figure 13B:
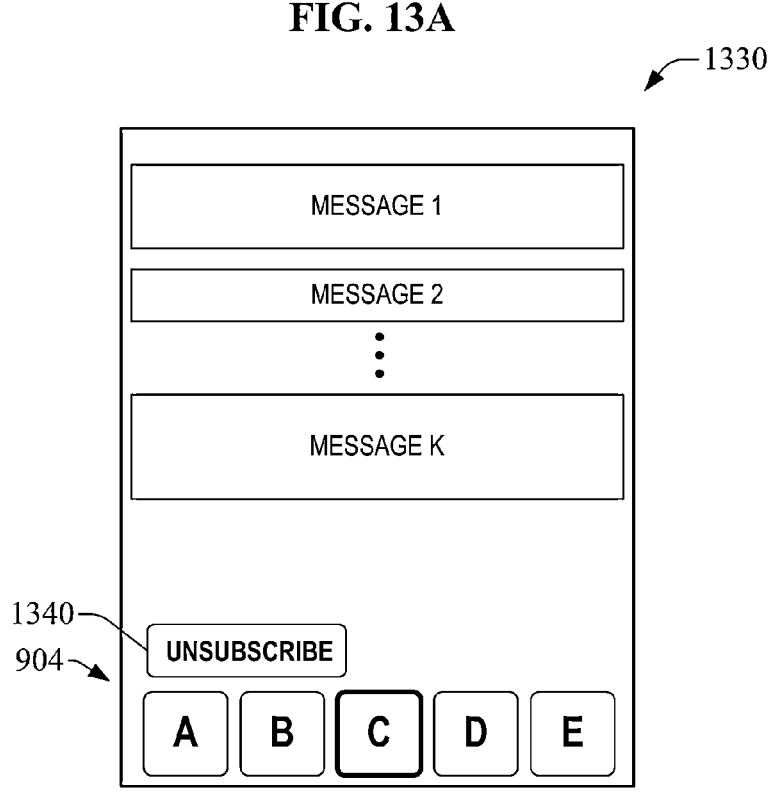

Example user interface 1300 in FIG. 13A conveys indicia that enable, at least in part, access to network operator feedback related to current or historical reports on network performance incident. A network operator (telecommunication carrier, service network provider, etc.) can provide part of the feedback based on a subscription and part of the feedback based on subscriber preference(s); in an aspect, a feedback system (e.g., 140) can generate and deliver the network operator feedback, as described supra. Actuation of a soft-button in the group of indicia 1306 can result in additional user interface(s) being rendered. As an example, block of indicia 1306 includes a "National Network News" soft-button 1308 that, when actuated, causes the device that renders UI 1300 to render information that can disclose planned network developments (e.g., deployment of 3G macrocell base station) or current response to a class of network performance incidents (e.g., lack of coverage in a specific area). Information conveyed as a result of actuation of "National Network News" soft-button 1308 can be disclosed as announcement(s); soft-button 1308 can present a number (K, a real number) of available announcements, or alerts, e.g., new announcements, announcements issued within a predetermined time interval, etc. Example UI 1330 in FIG. 13B represents the set of K announcements ("Message 1", "Message 2", "Message 3" . . . "Message K") that can be rendered. In addition, example UI 1330 can include an "Unsubscribe" soft-button 1340 that when actuated enables, in part, termination of a subscription to the "National Network News" alert service. Likewise, block of indicia 1306 can include a "Local Network News" soft-button 1310 that, when actuated, can cause the device that renders UI 1300 to render feedback information (e.g., announcements) for a specific area, which can be configurable and identified with a ZIP code or a geospatial entity object code (geocode). Soft-button 1310 also can display a number (P, a natural number) of available announcements.

Figure 13C:
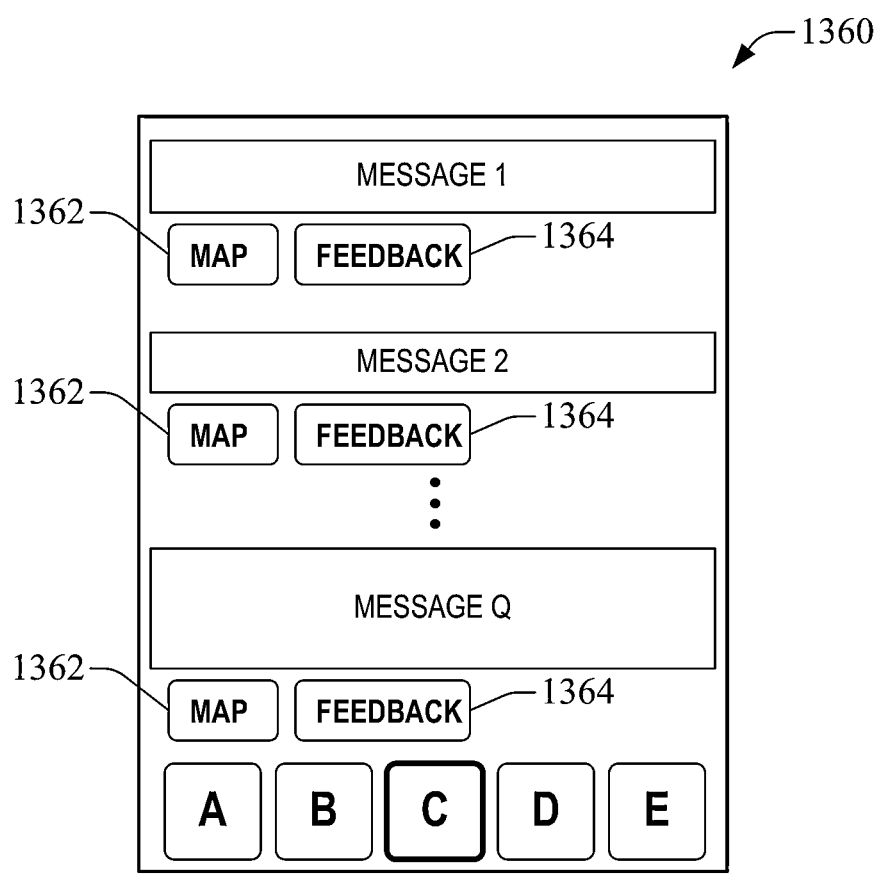

In addition, block of indicia 1306 can include a set of soft-buttons that conveys personalized feedback related to specific areas; personalization can be based at least on input received by the device that renders example UI 1300. Soft buttons 1312 and 1314 relate, respectively, to planned and complete "Personalized Reporting Area News", where announcement(s) in response to one or more classes of network performance incidents for a selected area (e.g., a specific ZIP code) are disclosed. Number of available announcements, or alerts, also can be rendered as part of soft-buttons 1312 and 1314; e.g., Q announcements for planned response and R announcements for complete response, with Q and P integer numbers. Example UI 1360 in FIG. 13C represents the set of Q announcements ("Message 1", "Message 2", "Message 3" . . . "Message Q") that can be rendered. In an aspect, each rendered message can include a "Map" soft-button 1362 and a "Feedback" soft-button 1364. Actuation of soft-button 1362 causes, in part, the device (e.g., 202) that renders example UI 1360 to render a UI that conveys a map with a location of the submission area related to the message and indicia (e.g., a circle) surrounding the prospective, or planned, network development. Actuation of soft-button 1364 can cause the device that renders the example UI 1360 to launch or execute an email application (software or firmware) or any other electronic communication application retained in a memory (e.g., 291) within the device (e.g., 202).

A UI similar to example UI 1360 can be rendered in response to actuation of soft-button 1314. In an embodiment of the UI that is similar to example UI 1360, feedback soft-button 1364 can be split in a plurality of soft-buttons (e.g., three soft-buttons) with each soft button characterizing the subscriber response to the complete network development (e.g., "Better Service", "Same Service", "Worse Service").

In example UI 1300, soft-button 1316, when actuated, can result in rendering of feedback content for predetermined area(s) of interest, e.g., university campus, workplace area, tourism destination, area where relatives live, or the like. In an aspect, content disclosed in response to actuation of soft-button 1316 can include community features that enable social interaction amongst subscribers that share an area of interest. For instance, subscribers that are interested in response of a network operator to issues that originate in a university campus can exchange messages in chat format, post messages in forum(s), or provide information in blog or micro-blog format.

Figure 14A:
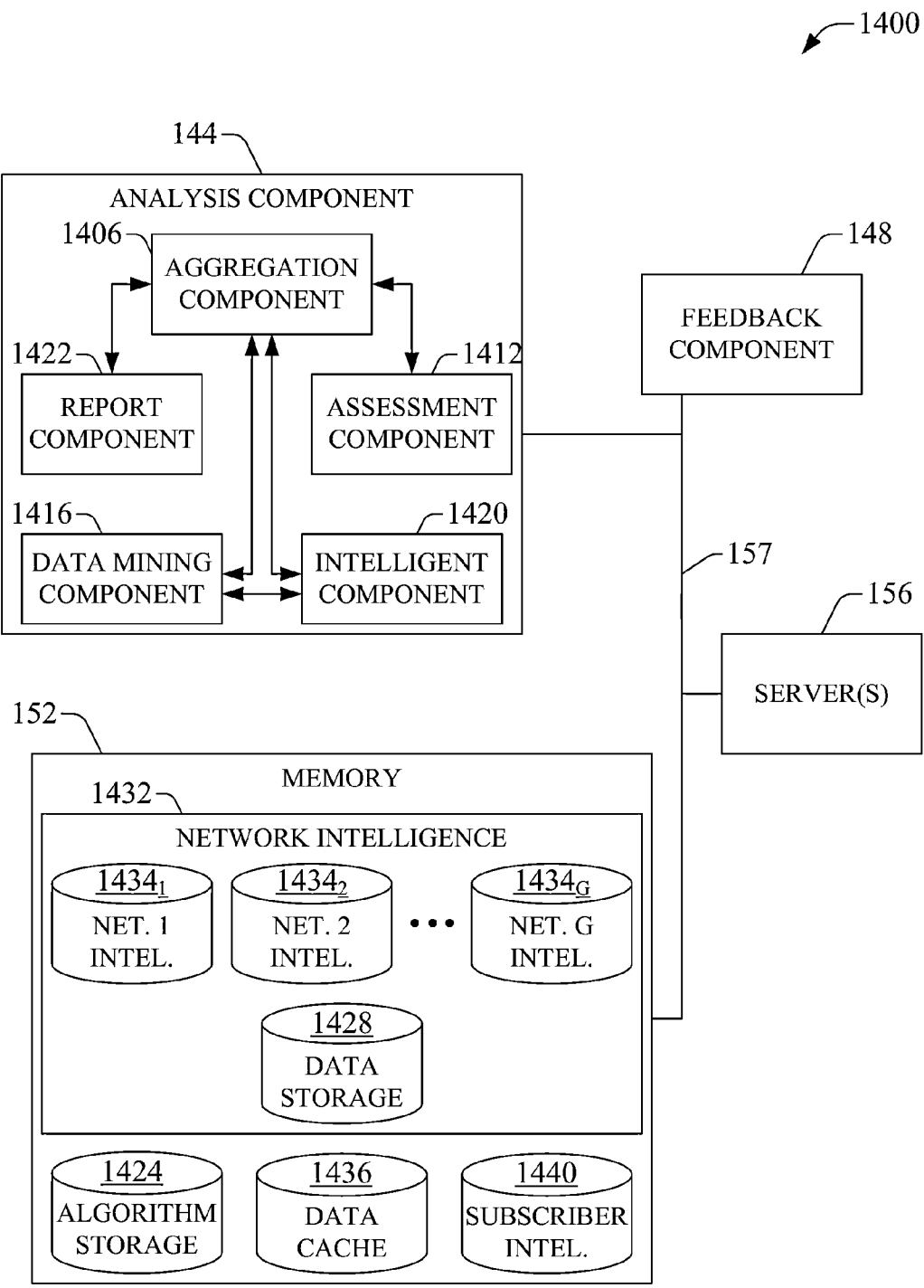
FIG. 14A is a block diagram of an example system that can generate and deliver network feedback based at least on received network performance data in accordance with aspects of the subject disclosure.

FIG. 14 displays a block diagram of an example embodiment 1400 of feedback system 140 in accordance with aspects disclosed herein. As indicated above, analysis component 144 receives data associated with a network performance incident from a set of devices 104 and analyzes the data. The data can include contents of report 110 and associated location (R) and time stamp (τ) linked to the network performance incident. In the illustrated example embodiment, analysis component 144 includes an aggregation component 1406 that collects the data received from the set of devices 104 and also can acquire (receive, retrieve, etc.) network operation data from at least one functionality layer, such as operation layer(s) 160 or external layer(s) 170. The aggregation component 1406 can retain the results of the analysis in network intelligence storage 1432, also referred to as network intelligence 1432 in the subject specification and drawings. As described supra, data associated with a network performance incident or with operation of a device (e.g., 202) that can report the network performance incident can include operation data of competing networks, network intelligence 1432 can be recorded according to specific network, e.g., network 1, network 2, . . . , network R, where R is natural number greater than or equal to unity; network intelligence (intel.) for network (net.) γ is retained in network k intelligence storage $1434_γ$, also referred to as network intel. $1434_γ$, with γ=1, 2 . . . G, where G is a positive integer. In addition, based on analysis of data associated with a plurality of network performance incidents, analysis component 144 can produce subscriber intelligence that reveals various subscriber preferences, such as utilized device, contracted services, reporting behavior or reporting pattern, reporting areas, or the like. As an example, subscriber intelligence can include a subscriber profile that includes subscriber device(s) and one or more subscriber preferences. Analysis component 144 can retain subscriber intelligence in memory 152 within subscriber intelligence storage 1440, also referred to as subscriber intelligence 1440. Subscriber intelligence 1440 also can include information related to devices owned or leased by a customer and service(s) subscribed by the customer. For example, subscriber intelligence 1440 can record a set of devices configured to report network performance incidents that a specific customer can operate and related feedback preferences, e.g., subscription to "Network News" and personalized areas for feedback (see, e.g., FIG. 13), and so on.

As part of the analysis, aggregation component 1406 can exploit assessment component 1412 to summarize, at least in part, the data available (e.g., collected or acquired data) as a result of a plurality of reports of network performance incidents. For example, aggregation component 1406 can extract (I) data associated with reports of network performance incidents received from a plurality of subscribers in an area proximate (e.g., within a predetermined radius or characteristic distance) to location R at the time τ or at times within a predetermined range Δτ from τ; and (II) alarm status or key performance indicators for network equipment that can affect service in the area proximate to R. Based at least on (I) and (II), and other customer-supplied information related to a network performance incident or network performance incident category, assessment component 1412 can provide an analysis of network operation condition. Such available data also can be categorized, for example, in accordance with type of network performance issue or network problem. In one or more additional or alternative embodiments of analysis component 144, assessment component 1412 can reside within aggregation component 1406.

Assessment component 1412 can operate on received or aggregated data to generate at least one network performance metric, or network operation metric, which is part of the network operation intelligence generated as a result of availability of the data reported by the set of devices 104. In an aspect, assessment component 1412 can compute one or more metrics associated with reported data on network performance incidents from a set of devices (e.g., 104) and that specify, at least in part, a probability that at least one device in the set of devices is experiencing a network-related performance issue or a device-related performance issue. In another aspect, from data collected from measured pilot signals at a time of an incident or after an incident, assessment component 1412 can determine operational parameters of a set of one or more competing network operators and retain such information in respective one or more network intelligence storage, e.g., network intelligence $1434_G$, in memory element 1432. As an example, assessment component 1412 can compute at least one of a number of unique sector identifiers per competing network operator or a number of unique sector carriers per competing network operator. In yet another aspect, assessment component 1412 can review and classify information, or data, on existing plans for network development in specific areas for which a set of reports on network performance incidents and related data are available; such plans can include plans for improvements to existing deployment(s) (e.g., optimization of deployment), new deployments or technology rollouts, new cell site builds, capacity augmentation (e.g., acquisition of additional licenses to portions of electromagnetic radiation spectrum), or the like. In still another aspect, based on aggregated data related to a plurality of network performance incidents, assessment component 1412 can generate, at least in part, a set of network interference matrices, wherein one or more matrices originate from interference measurements related to one or more competing network operators and the network operator that administers feedback system 140. Measurements of unique macrocell sector carriers performed by one or more devices that report a network performance incident can allow composing a matrix of mutual interference between such carriers.

As part of generation of network performance metrics, assessment component 1412 can compare submitted tickets for service in a given area and can normalize to the number of subscribers in the area that own or lease a device with a deployed (e.g., installed, tested, and active) incident report component (e.g., 106) to evaluate relative importance of problem areas. Such network performance metric can be employed for capital allocation or investment prioritization. In addition, data collected through network performance incident reports from customers in a specific area, with a Wi-Fi-enabled device but that do not utilize an available Wi-Fi AP in the specific area can be utilized to produce and deliver (e.g., via direct mail, email, or other media) offers for Wi-Fi service. Likewise, customer with a Wi-Fi enabled device with business or residential internet service provided by the network operator that provide telecommunication service but do not have Wi-Fi service, also can be offered Wi-Fi service. In contrast to conventional marketing of services or products, service offerings described herein are based on device-driven customer-supplied data on network performance incidents are highly customized and respond to an actual need, thus are more likely to produce a commercial transaction (e.g., retention of Wi-Fi service) than offerings provided through conventional mechanisms or systems and based on typical data segmentation.

As part of analysis of data related to report of network performance incidents, analysis component, via assessment component 1412, for example, can produce clusters of reported incidents. As an example, network performance incidents within a predetermined time interval (e.g., a block of two rush hours, such as 6:30 a-8:30 a) and within a predetermined distance of each other can be part of a cluster. Clusters can be categorized according to (A) clusters in an area with previously available information related to a network performance problem, e.g., "known problem", and (B) remainder clusters. As a result of such categorization, or filtering, provides clusters in areas with network performance problems for which network resources can be allocated to indentify a solution. As another example, network performance incidents can be mapped to their closest base station (or cell tower) to form clusters of incidents that spatially coincide with deployed base stations. In an aspect, by mapping network performance incidents to a base station, analysis component 144 can trigger a service ticket (e.g., a repair or maintenance ticket) for the base station based at least on number of reporting events, e.g., number of reports received from a set of unique reporting devices, for the base station. For instance, for the base station, assessment component 1412 can monitor temporal evolution of number of reports and, based on a set of rules, can identify a surge or "spike" in number of reports and generate an alarm, which report component 1422 can provide to operation layer(s) 160 (not shown in FIG. 14A), for example. Based at least on the alarm, one or more components in operation layer(s) 160 can generate a service ticket. Correlation of identified spikes and KPI for the base station, such as average dropped-call percentage can be exploited to determine threshold(s) for subscriber response to service degradation and thus effectively allocate resources to attain service performance compatible with subscriber response. Aggregation component 1406 can exploit intelligent component 1420 to establish such thresholds, which can be retained as part of network intelligence 1432.

In example embodiment 1400, data mining component 1416 can enable, at least in part, aggregation of acquired (received, retrieved, etc.) data and the various operations of assessment component 1412. Data mining component 1416 can extract data from data storage 1428 and can supply the data to aggregation component 1406, which can process the data or relay the data to assessment component 1412 for generation of network intelligence as described above. Data mining component 1416 can exploit, at least in part, intelligent component 1420 in order to at least extract spatial and temporal correlations between data or identify data patterns or network performance patterns, which can include location-based network performance patterns. Intelligent component 1420 can exploit various artificial intelligence (AI) methods.

Intelligent component 1420 also can exploit artificial intelligence (AI) methods to infer (e.g., reason and draw a conclusion based upon a set of metrics, arguments, or known outcomes in controlled scenarios) network performance incident(s) based at least on historical data of network performance incidents in a specific area or for a specific group of subscribers. In addition, intelligent component 1420 can exploit AI methods to optimize or to achieve a satisfactory utility trade-off between the cost of performing a network improvement directed to addressing (e.g., solving) one or more categories of network problems and the benefit of mitigating subscriber attrition as a result of presence of the one or more categories of network problems.

Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, analysis component 144, or components therein, can employ one of numerous methodologies for learning from data and then drawing inferences from the models so constructed. Such methodologies can be retained in memory 152 within algorithm storage. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited.

Analysis component 144, and one or more components therein, can utilize algorithm(s) retained in memory element 1424 in addition to at least a portion of data stored in data cache 1436, to implement at least a portion of the various, previously described operations on received or aggregated data, e.g., mapping, assessment, data mining, classification and segmentation, and so forth. It should be appreciated that data cache 1436 also can be external to data storage 1428 or memory 244. Algorithm(s) retained in memory element 1424 also includes at least one mathematical algorithm for analysis of time series originated from various reports of network performance incidents related to a specific area, or market, a specific base station, and a unique set of reporting devices (e.g., 104). For example, the at least one mathematical algorithm for analysis of time series can be defined or configured to detect (e.g., mathematically identify) a surge or spike in reporting of network performance incidents. When implemented, e.g., executed by a processor, such retained algorithm(s) can implement, at least in part, computation of statistics (e.g., averages, variances and standard deviations, covariance matrices . . . ); generation of database views, e.g., specific subsets of data; extraction and representation of data connectivity; transformation of data for spectral analysis thereof based upon Fourier transformation, wavelet transformation, . . . ; or the like.

Algorithm(s) in algorithm storage 1424 also can include algorithms that when implemented, e.g., executed by a processor, can afford to compress and extract data, or generate log records of data manipulation such as generation of network intelligence, creation of databases and new record views, or the like. Data compression can be accomplished at least in part via lossless data compression, which can be employed for received data that is deemed critical or strategic, or lossy compression for data that is readily available.

Data stored in data cache 1436 can serve as a training set for generation of models of network operation, e.g., such as traffic development, marketplace exploitation, and so forth. Contents of data cache 1436 also can serve to conduct one or more integrity tests of selected data, to ensure collected data is not corrupted or schedules of planned indoor scans are appropriate for collection of data for specific types of analysis.

In example embodiment 1400, findings of analysis of data acquired (e.g., received or retrieved) through reports of network performance incidents can be reported to various functional layers of a network operator network. For example, reports of analyzed data or network intelligence collected in network intelligence 1432 can be supplied to operation layer(s) 160 or to a planning layer (not shown) to enable, at least in part, network planning or network optimization (e.g., repairs). In an aspect, report component 1422 can generated reports of various aspects of network intelligence retained in memory element 1432 and can supply the reports to the various functional layers indicated supra. Report component 1422 can adjust format or content of a report base at least on the intended recipient of the report. In certain embodiments, report component 1422 can request aggregation component 1406 to produce specific views (e.g., portions of data that satisfy a predetermined criterion) of available data. As an example, report component 1422 can views of raw data (e.g., data that has not been analyzed) in accordance with specific time of occurrence of an incident, specific location(s) or area, specific category of incident, etc. Format of reported data can include charts, graphics, tables, or the like.

Figure 14B:
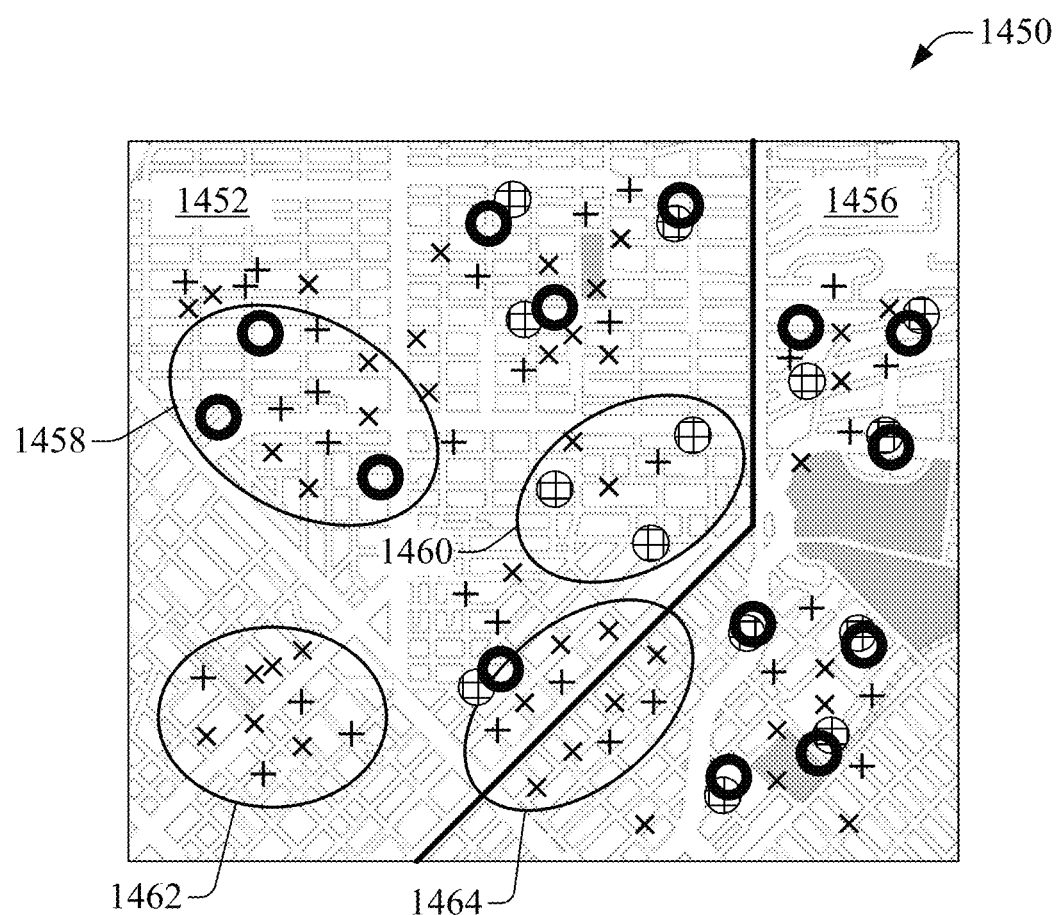
FIG. 14B illustrates an example network intelligence based on the received network performance data in accordance with an aspect described herein.

As an example of reports that enable, in part, network planning, FIG. 14B illustrates a diagram 1450 of spatial distribution of two categories of network incidents in a predetermined area, which can be selected for analysis; a first category of incidents is represented with upright crosses (+) and a second category is represented with slanted crosses (×). The predetermined area includes a first region 1452 associated with a first radio network controller and a second region 1456 associated with a second radio network controller; the first and second radio controllers can be part of access network(s) 114. In diagram 1450, a thick line represents the boundary amongst the first region 1452 and the second region 1456. In addition, diagram 1450 also includes a set of base stations onto which a set of the incidents have mapped; such base stations are represented with rings. Moreover, a second set of base stations identified to have operational problems and are scheduled for or actively being repaired; hatched circles represent such base stations. It is noted that base stations in the second set are not identified through device-driven reporting and associated analysis described herein, but are identified via conventional mechanisms instead. As illustrated, certain base stations in the first set and the second set are nearly overlapping in space; however, there are base stations in the first set that are not identified as problematic by conventional mechanisms. Moreover, there are base stations in the second set that are in regions of low density of reported incidents, even though such base stations are being repaired or scheduled for repairs. Therefore, in an example scenario, based on data associated with reports of network performance incidents and related analysis reported in diagram 1450, the network operator can allocate resources to repair base stations in group 1458 instead of base stations in group 1460.

Another feature of network intelligence provided through reports such as diagram 1450 is that no-coverage areas can be unveiled and thus network investment(s) can be directed to develop such areas; for example, area 1462 indicates a region in which network performance incidents are reported and no base stations are deployed therein. Similarly, network intelligence generated through analysis component 144 and conveyed in reports such as diagram 1400 can reveal regions with potential border issues, such as area 1464.

Figure 15:
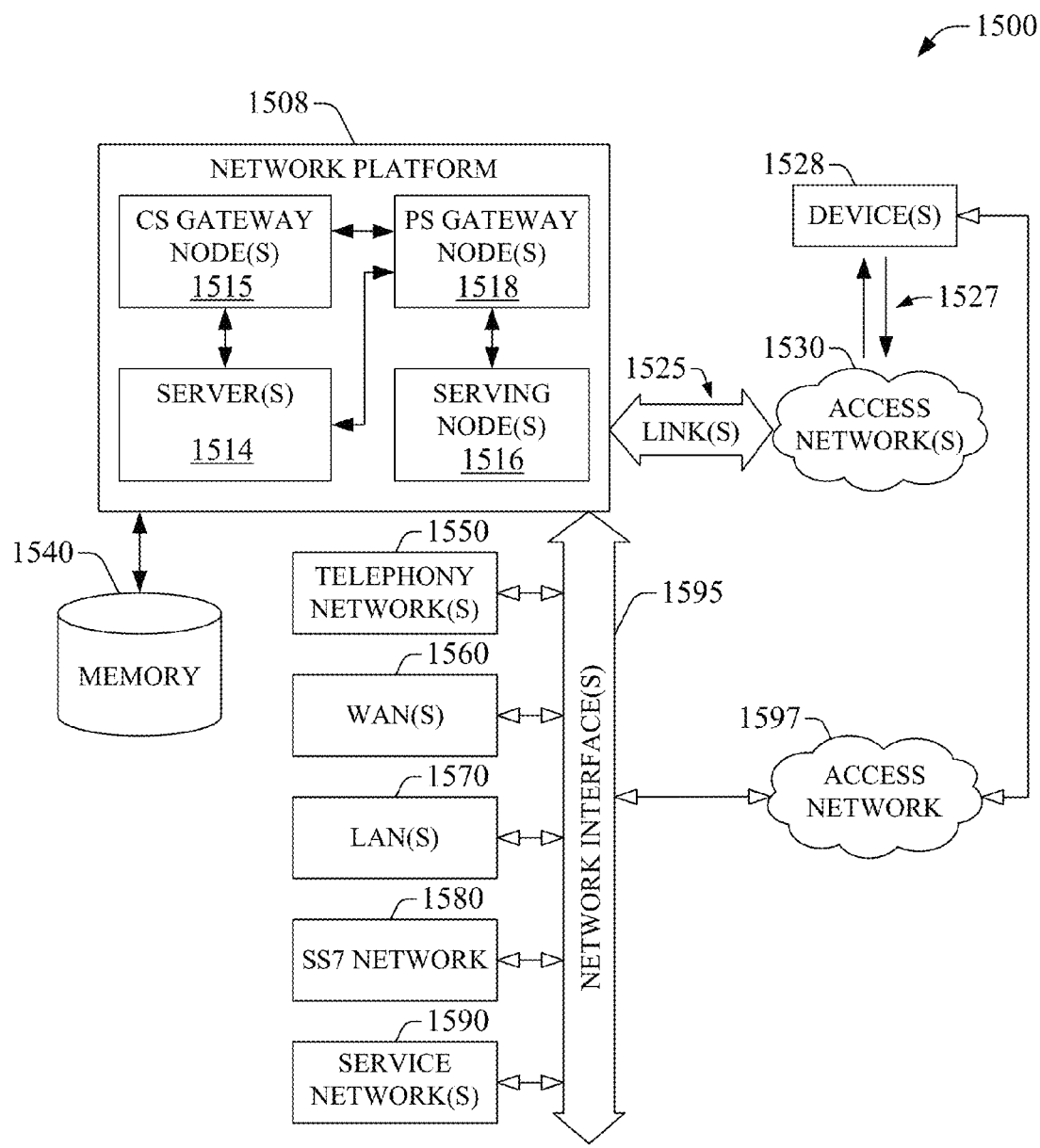
FIG. 15 is a block diagram of an example network environment that can enable various aspects of utilization of reports of network performance incident and related data in accordance with aspects of the subject disclosure.

FIG. 15 is a block diagram of an example network that can enable various aspects of the subject innovation. Network platform 1508 can include one or more functional elements, e.g., component(s), node(s), gateway node(s), interface(s), server(s), or platform(s) that enable both packet-switched (PS) (e.g., internet protocol (IP), frame relay, asynchronous transfer mode (ATM)) and circuit-switched (CS) traffic (e.g., voice and data) and control generation for networked communication, wireless or otherwise. In an aspect, network platform 1508 embodies network platform 120 described herein. It should be appreciated that in cellular wireless technologies (e.g., 3GPP UMTS, HSPA, 3GPP LTE, 3GPP UMTS, 3GPP2 UMB), network platform 1508 embodies a core network. PS gateway node(s) 1518 can embody at least part the PS domain. Functional element within the PS domain can enable exchange of notifications, indications, and directives in accordance with various networked communication protocols indicated herein, including one or more peer-to-peer transport protocol(s). With respect to CS communication, network platform 1508 includes CS gateway node(s) 1515, which can interface CS traffic received from legacy networks like telephony network(s) 1550 (e.g., public switched telephone network (PSTN), or public land mobile network (PLMN)) or a SS7 network 1580. CS gateway node(s) 1512 also can enable exchange of messaging communications in SMS protocol. In addition, CS gateway node(s) 1512 can authorize and authenticate traffic (e.g., voice) arising from such networks. Moreover, CS gateway node(s) 1512 can access mobility, or roaming, data generated through SS7 network 1560 in response to various mobility events as described herein; for instance, the mobility data can be stored in a VLR, which can reside in memory 1540. Furthermore, CS gateway node(s) 1512 can interface CS-based traffic or signaling with PS gateway node(s) 1518. As an example, in a 3GPP UMTS network, CS gateway node(s) 1512 can be embodied, at least in part, in gateway GPRS support node(s) (GGSN).

In the subject disclosure, in addition to receiving and processing CS-based traffic and signaling data, PS gateway node(s) 1518 can authorize and authenticate PS-based data sessions (e.g., an incoming call) with device(s) 1528 served through access network 1530 via link(s) 1525 and link(s) 1527, which include wireline links (e.g., reference links) or wireless link(s) (e.g., line-of-sight (LOS) links). Device(s) 1528 is a set of devices that includes wireless device(s), wireline device(s), or a combination thereof. For example, device(s) 1528 can include a mobile device of a subscriber that exploits device-driven reporting, related intelligence, and associated network feedback as described herein, and a set of wireline devices that also can exploit device-driven reporting, related intelligence, and associated feedback as described herein. Device(s) 1528 can embody the set of devices 104.

Access network(s) 1530 can include one or more components that enable transmission of data and signaling, including related payload data, amongst device(s) 1528 and network platform 1508; access network(s) 1520 can be part of access network(s) 152 and operate in substantially the same or the same manner thereof. Access network(s) 1530 can include a radio access network (RAN), and associated component(s). The RAN comprises one or more macrocell base stations, and associated electronic circuitry, and respective deployment site(s) of the one or more macrocell base stations. In addition, the RAN includes the air-interface, which comprises a least one wireless radio link operated in accordance with the base station(s) radio technology. It should be noted that the RAN comprises various coverage cells. For a wireless device served by base station(s) (not shown), one or more network components that are part of a radio access network in access network 1530 enable transmission of data and signaling. For wireline devices, one or more components that are part of a wireline network (e.g., service network(s) 1590) enable the transmission of data and signaling. Link(s), represented with open arrows, operationally coupled to network interface(s) 1595 can deliver data and signaling to the wireline device via the one or more components of the wireline network, for example represented by access network 1597, and related link(s) represented with open arrows connecting the access network 1597 to device(s) 1528. Data sessions (e.g., an incoming call) can include traffic exchange with networks external to network platform 1510, such as wide area network(s) (WAN(s)) 1560 or service network(s) 1590; local area network(s) (LAN(s)) 1570 (e.g., enhanced 911) also can be interfaced with network platform 1508 through PS gateway node(s) 1518. Network interface(s) 1595 enable the traffic exchange; such interface(s) can include conventional wireline or wireless links, or reference links specific to each of the external network(s) that interface with PS gateway node(s) 1518, or other portions of the PS domain in network platform 1508. In an aspect, PS gateway node(s) 1518 can generate packet data protocol (PDP) contexts when a data session is established. To at least that end, in an aspect, PS gateway node(s) 1518 can include a tunnel interface (e.g., tunnel termination gateway (TTG) in 3GPP UMTS network(s) (not shown)) which can facilitate packetized communication with disparate wireless network(s), which can be part of access network(s) 1530 and can include Wi-Fi networks, femtocell network(s), macrocell network(s) and associated radio access network(s) (RAN(s)) based on various radio technology generations, etc. It should be further appreciated that packetized communication can include multiple flows of data that can be generated through server(s) 1514, such as management server(s) (e.g., a provisioning server, a mobility switching center (MSC)) or application server(s), which, in certain embodiments, can implement at least a part of the functionality of server(s) 156. It is to be noted that in 3GPP UMTS network(s), PS gateway node(s) 1518 (e.g., GGSN) and tunnel interface (e.g., TTG) comprise a packet data gateway (PDG).

In network environment 1500, network platform 1510 also includes serving node(s) 1516 that conveys the various packetized flows of data streams that can be directed to device(s) 1528, and that are received through PS gateway node(s) 1518 from server(s) 1514. In turn, server(s) 1514 can receive the communication(s), such as request for data intended to service network(s) 1590, which can include an IP multimedia subsystem (IMS) core or other packet-based cores, from user equipment within device(s) 1528 or network elements. As an example, in a 3GPP UMTS network, serving node(s) 1516 can be embodied in serving GPRS support node(s) (SGSN). As another example, in a 3GPP LTE network, service node(s) 1516 can be embodied in a Mobility Management Entity (MME).

Server(s) 1514 can operate in various layers of network platform 1508. For example, server(s) 1514 can operate as part of Operations Support Systems (OSS), Business Support Systems (BSS), or network subsystems such as IMS core network. Server(s) 1514 can execute numerous applications, which can include consumer-oriented application(s), such as messaging services, location services, online gaming, wireless banking, or system-oriented applications, e.g., wireless device management, scheduling or queuing of network traffic, or the like. Such application(s), either consumer-oriented or system-oriented, can generate sets of packetized data streams or flows, and manage (e.g., schedule, queue, format . . . ) such flows. Such application(s), for example can include add-on features to standard services provided by network platform 1510; in an aspect, the add-on features can include the customized communication processing described herein. Data streams generated by server(s) 1514 can be conveyed to PS gateway node(s) 1518 for authentication/authorization and initiation of a data session (e.g., an incoming call), and to serving node(s) 1516 for communication to device(s) 1528 thereafter.

Server(s) 1514 also can effect security (e.g., implement one or more firewalls; see, e.g., 2530) of network platform 1508 to ensure network's operation and data integrity in addition to authentication and authorization procedures that CS gateway node(s) 1512 and PS gateway node(s) 1518 can enact. In addition, server(s) 1514 can implement timing protocols (e.g., Network Time Protocol (NTP)) that supply timing framework(s) for various operation(s) of network platform 1508. Moreover, server(s) 1514 can provision services from external network(s), e.g., WAN(s) (wide area network(s)) 1560, LAN(s) (local area network(s)) 1570, IMS core network, which can be part of service network(s) 1590, or Global Positioning System (GPS) network(s) (not shown). Server(s) 1514 can include one or more processors (not shown) configured to provide or that provide, in part, the functionality of network platform 1508. To that end, the one or more processors can execute one or more sets of code instructions (not shown) stored in memory 1540, for example.

In example network environment 1500, memory 1540 can store information related to operation of network platform 1508. Information can include content(s), such as subscriber-generated content or from various other sources; subscriber account(s) and associated credential(s); pricing schemes, e.g., promotional rates, flat-rate programs, couponing campaigns; and so forth. Memory 1540 also can store part of data related to implementation of device-driven reporting of network incidents, associated intelligence, and related network feedback and network intelligence. In addition, memory 1540 can store information from at least one of telephony network(s) 1550, WAN(s) 1560, LAN(s) 1570, SS7 network 1580, or service network(s) 1590. While illustrated as a single entity, memory 1540 can be distributed amongst one or more of the described external networks, server(s) 1514, or other functional elements of network platform 1510. Memory 1540 can be embodied at least in part in a visitor location register (VLR), a home subscriber server (HSS), or storage available within a consolidated data repository that centralizes data (administrative data, operational data, etc.) for at least network platform 120.

Figure 20:
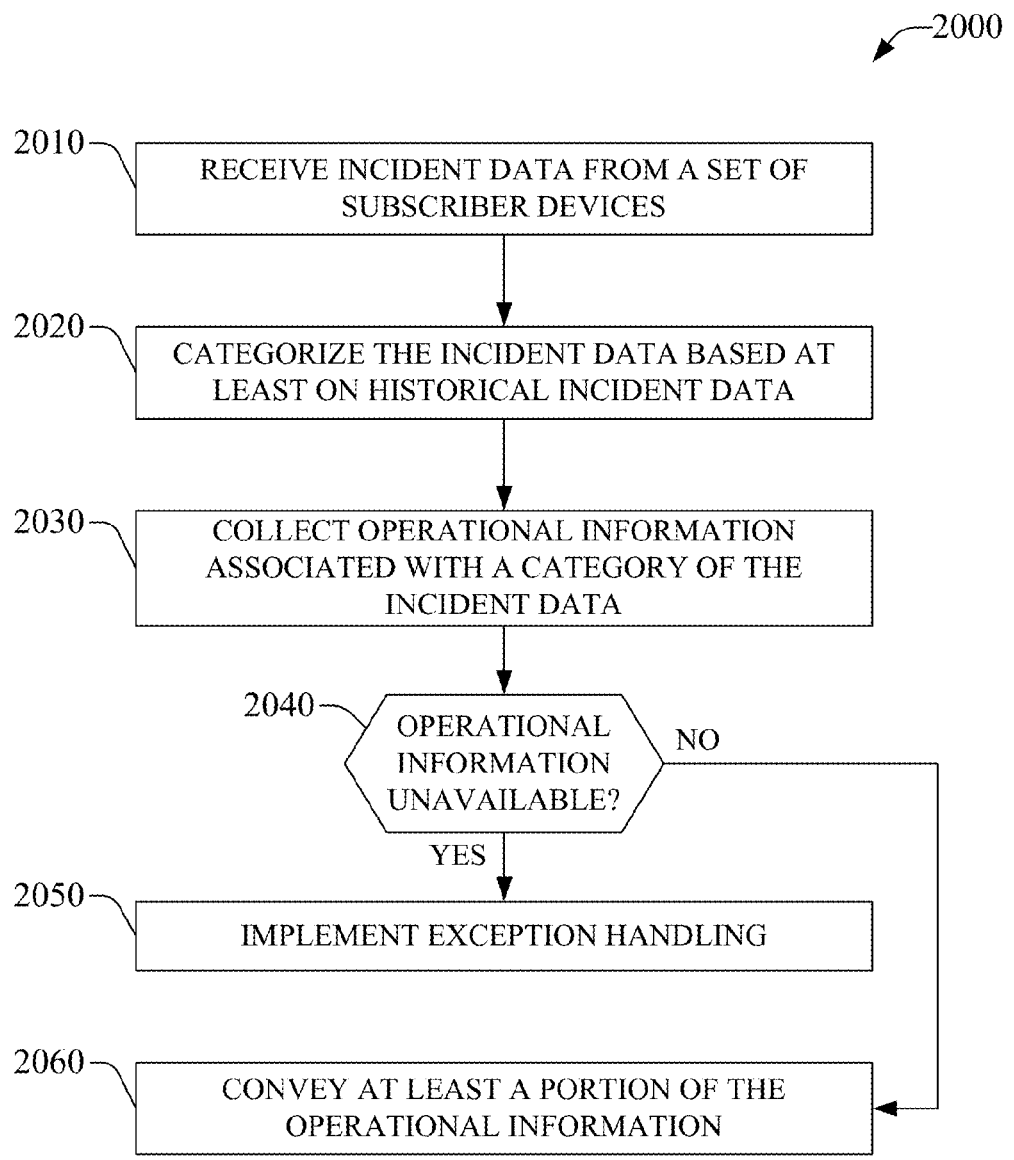
FIG. 20 is a flowchart of an example method for acquiring information on network performance in accordance with an aspect disclosed herein.
Figure 21:
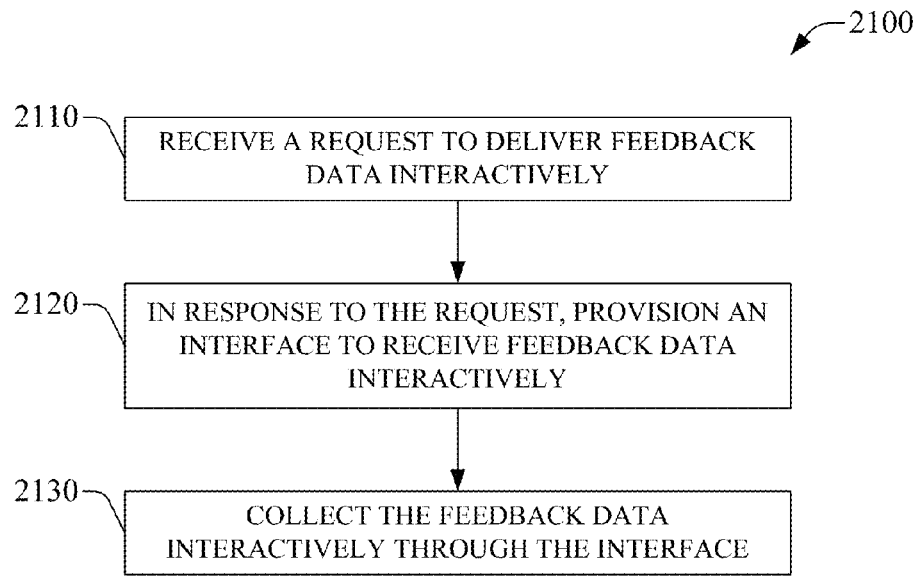
FIG. 21 is a flowchart of an example method for acquiring feedback on network operation and related performance incidents according to aspects described herein.
Figure 22:
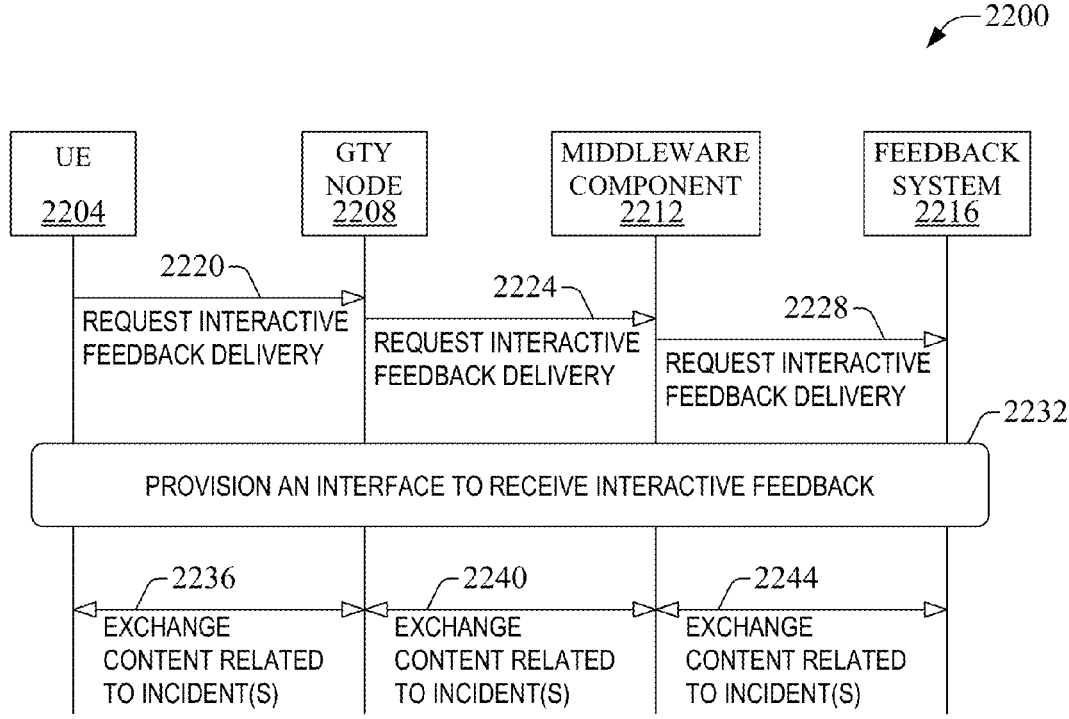
FIG. 22 presents a call flow of an example method for establishing interactive feedback delivery according to aspects of the subject disclosure.

In view of the example systems described above, example methods that can be implemented in accordance with the disclosed subject matter can be better appreciated with reference to flowcharts in FIGS. 16-21 and 23-24, and call flow in FIG. 22. For purposes of simplicity of explanation, various methods disclosed herein are presented and described as a series of acts; however, it is to be understood and appreciated that the claimed subject matter is not limited by the order of acts, as some acts may occur in different order and/or concurrently with other acts from that shown and described herein. It is noted that not all illustrated acts may be required to implement a described method in accordance with the subject specification. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in the subject disclosure.

Methods disclosed throughout the subject specification and annexed drawings are capable of being stored on an article of manufacture (e.g., a removable volatile memory or non-volatile memory) to facilitate transporting and transferring such methods to computers for execution, and thus implementation, by a processor, or for storage in a memory. In an aspect, one or more processors, such as processor(s) that enact the one or more method described herein, can be employed to execute code instructions retained in a memory (volatile or non-volatile), or any computer- or machine-readable storage medium, to implement one or more of the method described herein. Such code instructions provide a computer-executable or machine-executable framework to enact the various methods described herein.

Figure 16:
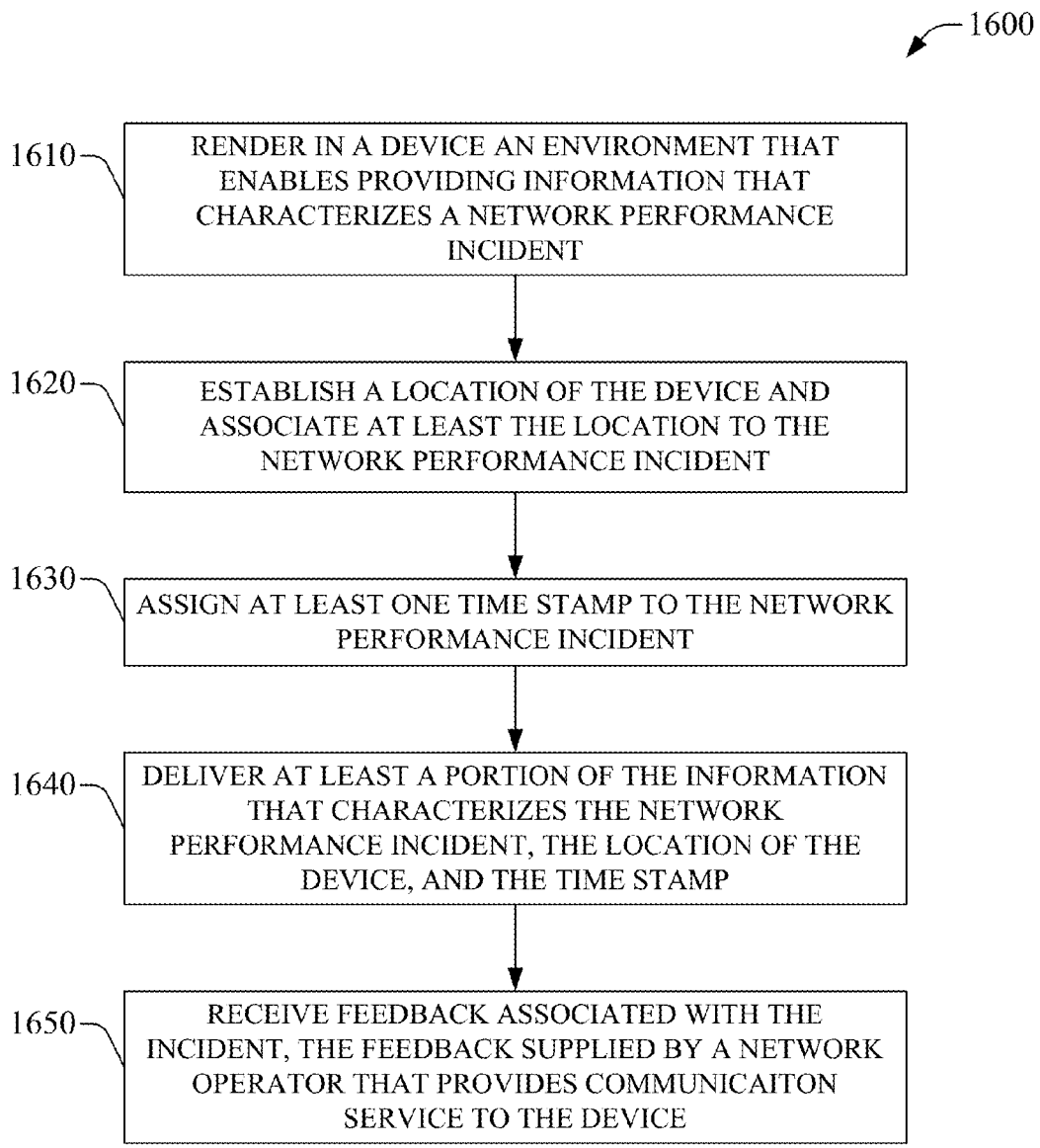
FIG. 16 displays a flowchart of an example method for reporting a network performance incident in accordance with one or more aspects described herein.

FIG. 16 displays a flowchart of an example method 1600 for reporting a network performance incident in accordance with aspects of the subject disclosure. In an aspect, a device, mobile or otherwise, can enact the subject example method. In another aspect, one or more processors configured to enable or that enable at least part of the functionality of the device (UE, CPE, etc.) also can enact, at least in part, the subject example method. At act 1610, an environment that enables providing information that specifies a network performance incident is rendered in a device, which is the device that implements, at least in part, the subject example method. At act 1620, a location of the device (e.g., a position vector R; see FIG. 1) is established and at least the location is associated to the network performance incident. Position vector allows determining an estimate of ground truth of the device and orientation of the device, such as heading. In addition, in certain embodiments, position vector can convey altitude, course, horizontal accuracy or vertical accuracy. At act 1630, at least one time stamp is assigned to the network performance incident. In an aspect, the at least one time stamp can be generated by the device. In another aspect, timing information received by the device, e.g., a GPS timing message can be utilized to determine the at least one time stamp. At act 1640, at least a portion of the information that specifies the network performance incident, the location of the device, and the time stamp are delivered. In one or more scenarios, various combinations of information, location, and time stamp(s) also can be delivered; for instance, at least the portion of the information that specifies the network performance incident and the location of the device can be delivered, but not the time stamp assigned to the network performance incident.

At act 1650, feedback associated with the network performance incident is received (see, e.g., FIG. 1), the feedback supplied by a network operator that provides communication service to the device through the network in which the network performance occurs. In one or more embodiments, the network operator can provide other service(s) in addition to or instead of communication service; as an example, the device can be a digital video recorder (DVR) an the network operator can provide entertainment via a pay-per-view subscription or contracted cable service.

Figure 17:
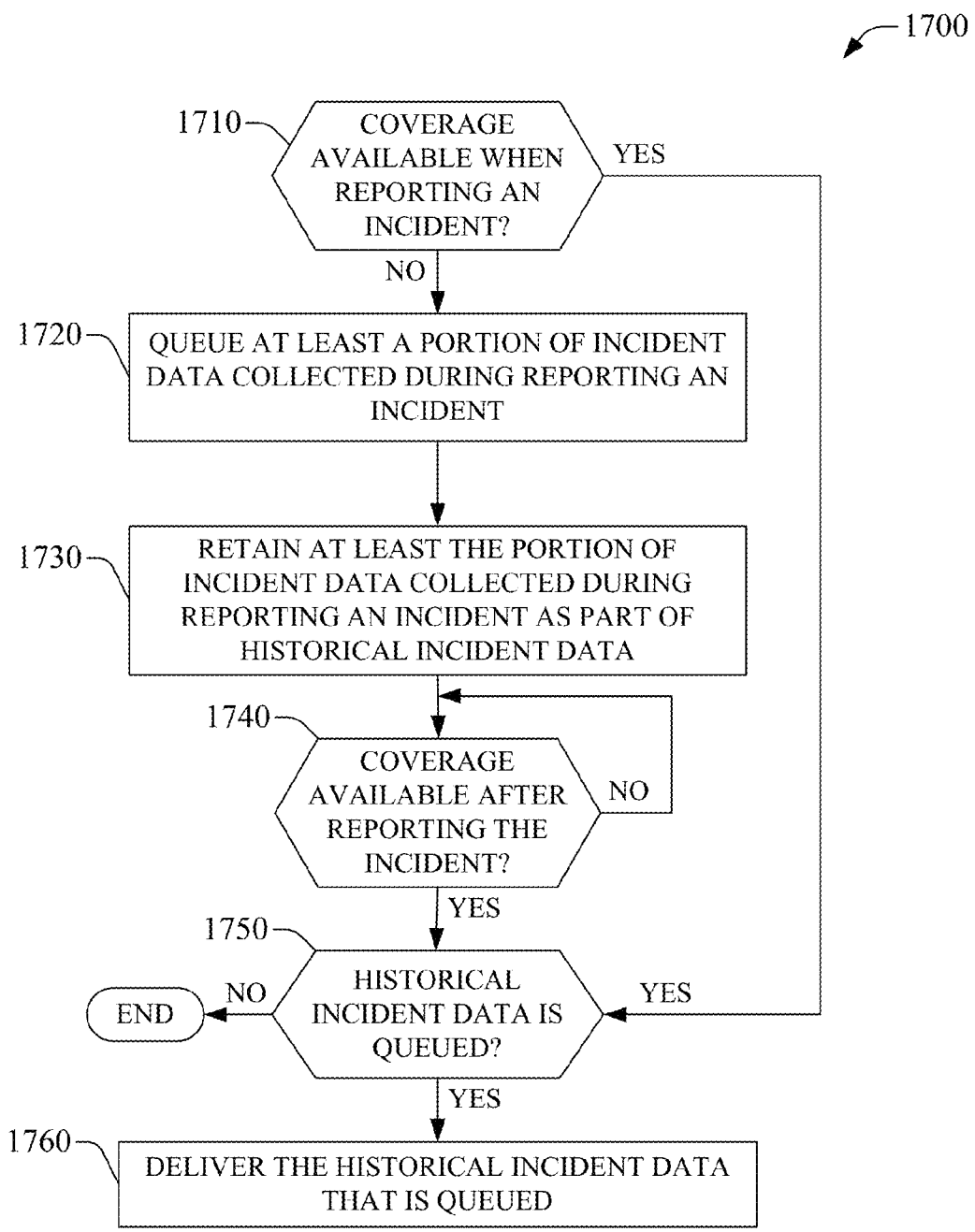
FIG. 17 presents a flowchart of an example method for delivering information that characterizes a network performance incident and related data according to aspects of the subject disclosure.

FIG. 17 presents a flowchart of an example method 1700 for delivering at least one of information that specifies a network performance incident, a location of a device that reports the network performance incident, or a time stamp assigned to the network performance incident, according to aspects of the subject disclosure. In one aspect, one or more acts of the subject example method can be part of act 1640 in example method 1600. A device that enacts subject example method 1600 can enact the subject example method 1700. At act 1710, it is determined if coverage, or service coverage, is available when reporting an incident. In one or more embodiments, the incident is a network performance incident. In an aspect, "when reporting an incident" can refer to a time at which an environment that enables reporting the incident is rendered. In another aspect, the temporal reference "when reporting an incident" can refer to a period that commences at an instant prior to the incident and spans a time interval that includes the reporting of the incident.

A positive outcome to act 1710 directs the flow to act 1750, which is described below. Conversely, a negative outcome of act 1710 directs the flow to act 1720, at which at least a portion of incident data (e.g., time stamp, location of reporting device, content collected by the device . . . ) collected during reporting an incident is queued. For devices that implement the subject method and include GNNS functionality, a location estimate of the position of the device is generally available even though wireless service coverage can be unavailable when reporting the incident. For a device that implements the subject example method and lacks GNNS functionality and produces location estimate(s) based in part on time-of-flight measurements, a location of the device when reporting an incident can be estimated through historical location estimates, which can be retained, at least temporarily, in a memory within the device. At act 1730, at least the portion of incident data collected during reporting the incident is retained as part of historical incident data. In one or more embodiment, data storage 293 can retain the historical incident data.

At act 1740, it is determined if coverage is available after reporting the incident. In an aspect of the subject disclosure, determining availability of coverage includes determining if coverage provided through one or more services alternative or additional to macro-cellular service is available. For instance, the determining can include probing if femtocell service or Wi-Fi service is available; such probing can be accomplished by scanning (e.g., collecting and decoding) pilot signal for various services and assessing signal strength. A negative outcome results in re-enacting act 1740, whereas a positive outcome leads to act 1750, at which it is probed if historical incident data is queued. A negative outcome of act 1750 terminates the subject example method. Conversely, a positive outcome of act 1750, leads to act 1760, at which the historical incident data that is queued is delivered.

Figure 18:
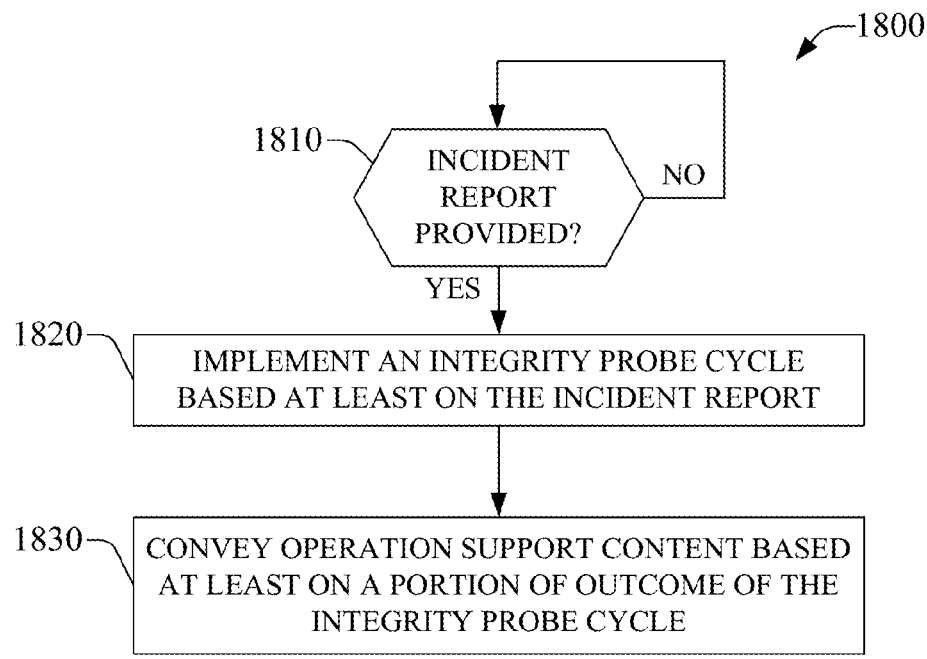
FIG. 18 presents a flowchart of an example method for supplying end-user support content according to aspects of the subject disclosure.

FIG. 18 presents a flowchart of an example method 1800 for supplying end-user support content according to aspects of the subject disclosure. The device or the one or more processors that implement example methods 1600 or 1700 also can implement the subject example method. At act 1810, it is determined if an incident report is provided. The determining can be based on monitoring execution of at least one set of code instructions (e.g., a software application or a firmware application) that enable delivery of the incident report and related data. If the determining indicates that no incident report is provided, act 1810 is re-enacted. Conversely, if the determining establishes that an incident report is provided, then, at act 1820, an integrity probe cycle based at least on the incident report is implemented. For example, for a "Data Failure" incident and associated report, a diagnosis loop, which can be embodied in one or more sets of code instructions retained in a memory (e.g., app. storage 291) can be executed by processor(s) 275.

At act 1830, operation support content is conveyed based at least on a portion of outcome of the integrity probe cycle. In an aspect, conveying the operation support content includes generating at least one message that includes a recommendation or an instruction associated with the incident report, and rendering the at least one message; the generating and rendering effected by the device that implements the subject example method. In one or more embodiment, the rendering includes displaying one or more graphical user interfaces (GUIs) that disclose the at least one message. In another aspect, conveying the operation support content includes delivering at least one of a request and the portion of outcome of the integrity probe to a backend service node, which can be part of a backend service system (e.g., 140), to generate and supply the operation support content.

In one or more embodiments, example method 1800 also can include receiving information related to a network service that is available to the device and that can improve performance of the device. In such embodiment(s), a feedback system (e.g., 140) can generate the information based on historical data related to integrity probe cycles for the device, and can deliver the information to the device.

Figure 19:
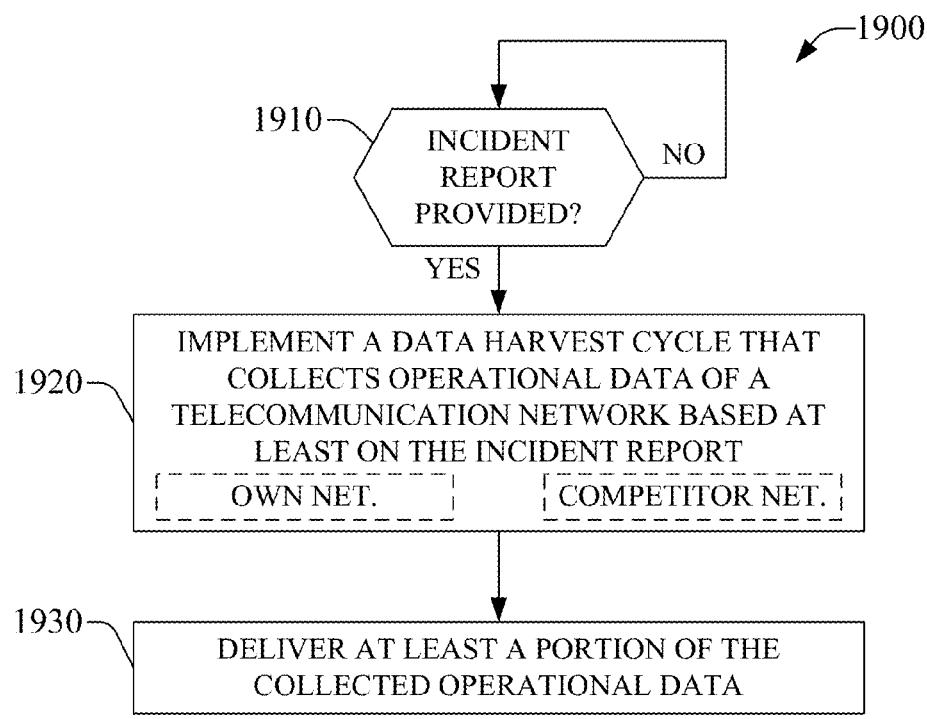
FIG. 19 is a flowchart of an example method for acquiring competitive data on network performance in accordance with aspects described herein.

FIG. 19 is a flowchart of an example method 1900 for acquiring competitive data on network performance in accordance with aspects described herein. The device or the one or more processors that implement example methods 1600, 1700, or 1800 also can implement the subject example method. At act it is determined if an incident report is provided. This act is substantially the same or the same as act 1810. If the determining indicates that no incident report is provided, act 1910 is re-enacted, but if the determining establishes that an incident report is provided, then, at act 1920, a data harvest cycle that collects operational data of a telecommunication network based at least on the incident report is implemented. The data harvest cycle can be embodied in one or more sets of code instructions stored in a memory (e.g., app. storage 291) or a computer-readable or machine-readable storage medium; the one or more processors (e.g., 275) that implement the subject example method 1900 can execute the one or more sets of code instructions. In an aspect, the implementing includes measuring (e.g., detecting or decoding) pilot signal transmitted, or radiated, by a base station or access point operated by an owned network or by a competing network. At act 1930, at least a portion of the collected operational data is delivered. The delivering includes supplying such data to one or more network nodes or one or more backend service nodes, which can process (aggregate, analyze, etc.) the operational data and relay the processed data to at least one functional layer (e.g., 160 or 170) operationally coupled to the one or more backend service nodes.

FIG. 20 is a flowchart of an example method 2000 for acquiring information, or data, on network performance in accordance with an aspect of the subject disclosure. In an aspect, at least one backend service node (e.g., analysis component 144, feedback component 148, server(s) 156) can enact the subject example method. In another aspect, one or more processors can implement the subject example method, wherein the one or more processors are configured to enable or enable, at least in part, functionality of the backend service node. At act 2010, incident data is received from a set of one or more subscriber devices (e.g., device(s) 104). Incident data refers to data that characterizes a network performance incident, as described supra. At act 2020, the incident data is categorized, or classified, based at least on one or more of historical incident data (e.g., reporting time interval), specific set of reporting devices, reporting area or market. At act 2030, operational information associated with a category of the incident data is collected. The at least one backend service node that enacts the subject example method can generate the operational information. In one or more embodiments, feedback component 148 can retrieve or receive, or otherwise acquire, the operation information from at least one memory that retains the operation information; the at least one memory can be part of at least one of an operation layer (e.g., 160) and an external layer (e.g., 170).

At act 2040, it is determined if operational information is unavailable. If operational information is unavailable, exception handling is implemented at act 2050. In one example, exception handling includes issuing a service reference ticket to address the network performance incident. In the alternative, if operational information is available, at least a portion of the operational information is conveyed at act 2060. As discussed supra, the operational information can be conveyed as feedback (e.g., 150) to at least one subscriber device that delivered the incident data.

FIG. 21 is a flowchart of an example method 2100 for acquiring feedback on network operation and related performance incidents according to aspects described herein. The functional element(s) (backend service node, at least one processor, etc.) that implement example method 2000 also can enact the subject example method 2100. At act 2110, a request to deliver feedback data interactively is received. At act 2120, an interface to receive feedback data interactively is provisioned in response to the request. Provisioning the interface can include provisioning a chat service or instant messaging service that enables exchange of content amongst a device (mobile or otherwise) and a backend service node or component(s) functionally coupled thereto. Provisioning the interface to receive feedback data interactively also can include enabling the interface to convey content in response to received feedback data. At act 2130, the feedback data is collected interactively through the interface.

FIG. 22 presents a call flow of an example method 2200 for establishing interactive feedback delivery according to aspects of the subject disclosure. The subject example method complements example method 2200 and illustrates at least one configuration of functional elements that enable interactive delivery of feedback data. At act 2220, user equipment (UE) 2204 conveys a request for interactive feedback delivery. The request can be conveyed to gateway (GTY) node 2208 via an access network, such as a radio access network (RAN) (not shown in FIG. 22). Gateway (GTY) node 2208 receives the request and, at act 2224, relays the request to middleware component 2212, which transmits the request to feedback system 2216 at act 2228. Feedback system 2216 provisions, at least in part, an interface to receive interactive feedback at act 2232; the subject act or parts thereof can be implemented by middleware component 2212, GTY node 2208, and UE 2204, which can exchange various messages, which can be grouped in groups 2236, 2240, and 2244, to enable the provisioning. For instance, messages associated with authentication of UE 2204 can be exchanged amongst UE 2204 and at least one server within feedback system 2216, wherein such messages are relayed by GTY node 2208 and middleware component 2212. As another example, the provisioning act 2232 can include establishing a secure tunnel for content delivery in accordance with one or more secure protocols, such as SCP, SSH, SFTP, or the like.

In an aspect, the provisioning act 2232 includes initiating a chat session and rendering a user interface to in UE 2204 to receive input data and convey input; the input data can be received from an end-user or from at least one component (e.g., feedback component 148) that is part of feedback system 2216. Input data received by the UE 2204 from the at least one component can be generated within a customer service layer, which can be part of external layer(s) 170, and supplied to the at least one component for delivery to UE 2204. In one or more embodiments, device 202 can embody UE 2204 and feedback system 140 can embody feedback system 2216.

Figure 23:
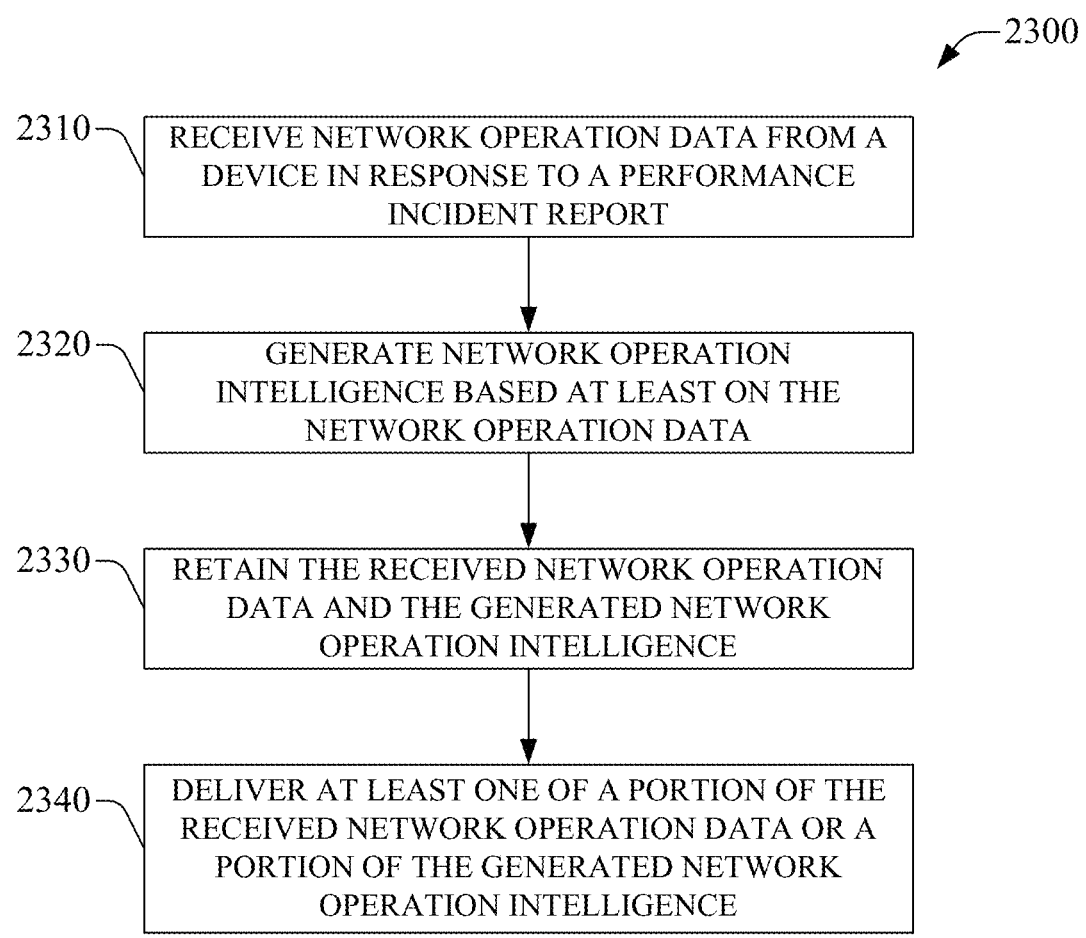
FIG. 23 is a flowchart of an example method for producing network intelligence based at least on data received through report(s) of one or more network performance incidents according to aspects of the subject disclosure.

FIG. 23 is a flowchart of an example method 2300 for producing network intelligence based at least on data received through reporting of one or more network performance incidents according to aspects of the subject disclosure. The produced network intelligence can be exploited at least for network planning and investment prioritization, and related network planning and optimization (see, e.g., FIG. 14B and associated description). At act 2310, network operation data from a device is received in response to a performance incident report. At act 2320, network operation intelligence based at least on the network operation data is generated. At act 2330, the received network operation data and the generated network operation intelligence is retained. The network operation intelligence can be retained for further processing and for developing investment allocation plans, and for optimizing the network for which operation data is received. As an example, if the network intelligence reveals that a substantive number of subscribers (as compared to a predetermined threshold, for example) in an area have reported "no coverage", the network operator that exploits the network operation intelligence can invest resources to enhance service provided to the subscribers in the area. At act 2340, at least one of a portion of the received network operation data or a portion of the generated network operation intelligence are delivered.

Figure 24:
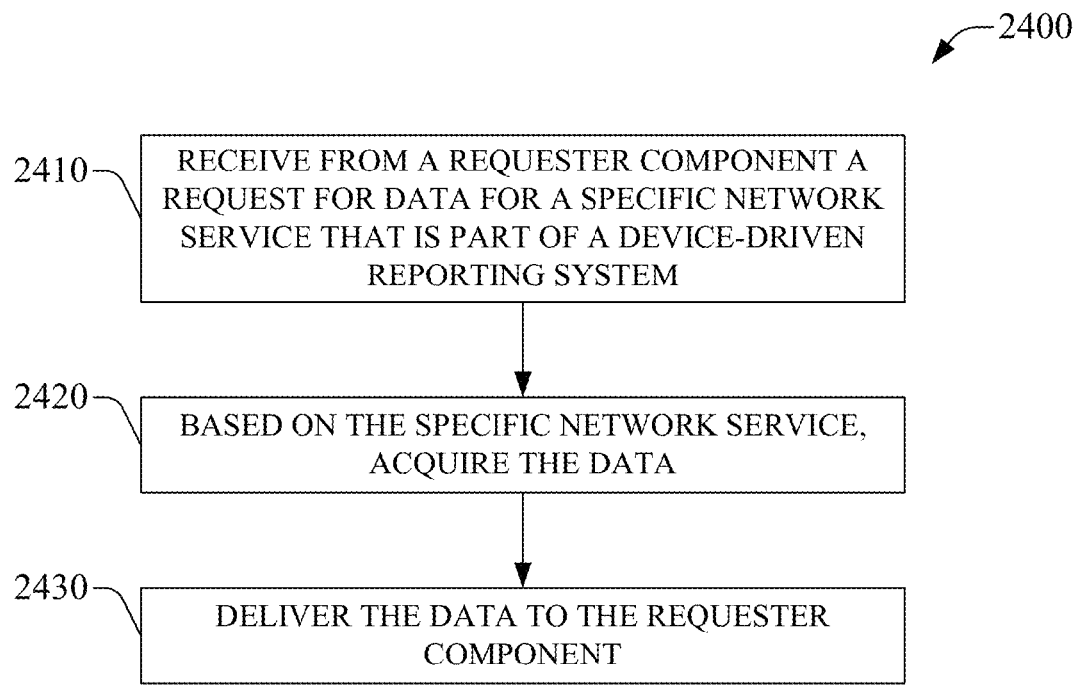
FIG. 24 is a flowchart of an example method for supplying data to a device that can report a network performance incident in accordance with aspects described herein.

FIG. 24 is a flowchart of an example method 2400 for supplying data related to a specific network service associated with a network performance reporting system according to aspects described herein. In an aspect, the subject example method 2400 can be implemented by a component in feedback system 140, or one or more components therein (e.g., feedback component 148). In another aspect, the subject example method 2400 can be implemented, at least in part, by a server (e.g., server(s) 156) that provide or are configured to provide the functionality of the feedback system 140 as described supra. At act 2410, a request for data for a specific service that is part of a device-driven network performance reporting system is received from a requester component. In an embodiment, the requestor component is a component (e.g., collection component 232) in a device that can report network performance incidents, such as device 202. In such embodiment, the request can be related to one or more of (i) subscription to a network feedback service or termination of subscription to the network feedback service, (ii) access to specific network alerts; (iii) access to a location-based service that can provide a ground truth estimate for the device; (iv) access to map(s) and information related to network development plans; or the like. In another embodiment, the requestor component can be a planning tool component that is part of operation layer(s) 160.

At act 2420, the data is acquired based on the specific network service. As an example, if the request is a query for network news, the feedback system component (e.g., feedback component 148) that implements the subject example method, can acquire the data from an operation layer, or a network node therein, such as a memory or memory element. In the alternative or in addition, the feedback system component (e.g., feedback component 148) can acquire the data from a memory that is part of the feedback system (e.g., 140). As another example, if the request relates to access to network intelligence produced in the feedback system, the feedback system component can access memory 152 and acquire the data.

At act 2430, the data is delivered to the requestor component. In one or more embodiments, a report component in feedback component 148 can convey the data. Delivering the data includes conveying a data message, with at least a portion of the data as payload, or conveying a SMS communication or MMS communication, wherein either of such communications can transport the data as payload.

Figure 25:
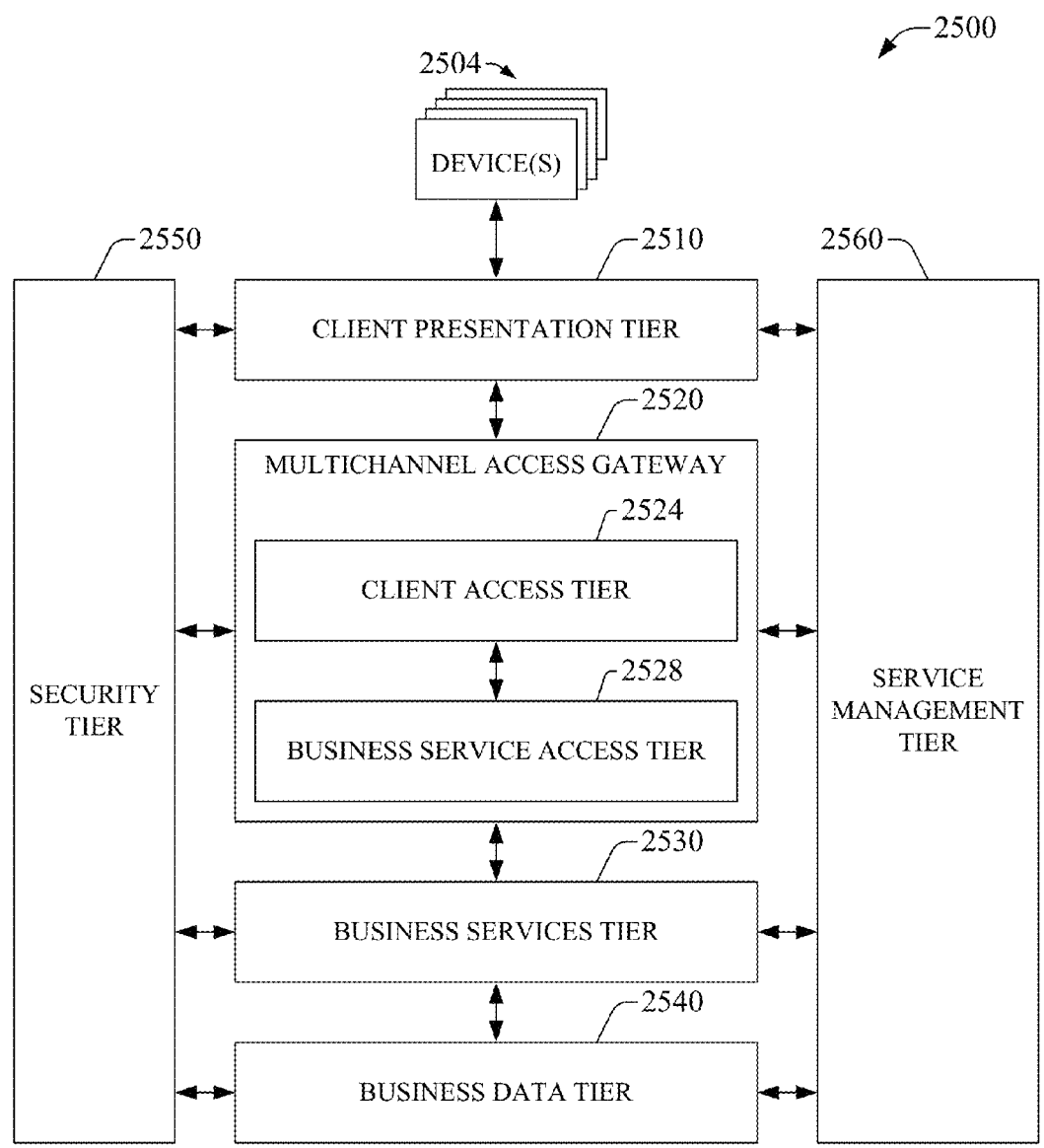
FIGS. 25-26 are example systems that enable various aspects of device-driven intelligence and feedback for performance enhancement and planning of a service network described herein.

FIG. 25 illustrates a block diagram of an example system 2500 that enables various aspects described herein. The example system 2500 includes a set of one or more device(s) 2504 and a logical grouping of various tiers that enable disparate functionality associated with device-driven intelligence and related feedback, and generation of network intelligence. The set of one or more device(s) 2504 can embody the set of devices 104; in an aspect, at least one device in the set of one or more device(s) 2504 includes an incident report component (e.g., 106). A tier can include component(s), electronic circuitry, server(s), memory(ies), or any combination thereof. Various tiers can be connected through wired or wireless links, reference links, various bus architectures, or any combination thereof. Client presentation tier 2510 enables communication with at least one device in the set of one or more device(s) 2504, and can include access network(s) 114. In addition, client presentation tier 2510 manages connectivity of the at least one device with multichannel access gateway 2520.

Multichannel access gateway 2520 comprises client access tier 2524 and business service access tier 2528. In an aspect, client access tier 2524 can authenticate a client application (e.g., incident report component that is embodied in a set of code instructions retained in a memory and executed by a processor in the at least one device) and can authorize the client application. In another aspect, client access tier 2524 can implement data validation, and can manage format of data exchanged between client presentation tier 2510 and business services tier 2530. In certain embodiments, gateway node(s) (e.g., 124) that can be part of a network platform (e.g., 120) can reside in client access tier 2524.

Business service access tier 2528 can implement service registration with external layer(s) (e.g., 170) and session management for a client application and a related service (e.g., a back-end application). In addition, business service access tier 2528 can implement data transformation to ensure suitable delivery to a device in the set of one or more device(s) 2504; data that is transformed can be data exchanged between the device and a related client application and a backend service. In certain embodiment, gateway node(s) (e.g., 124) that can be part of a network platform (e.g., 120) can reside in business service access tier 2528.

Business services tier 2530 can administer back-end services. For example, business service tier 2530 can enable back-end service(s); authorize and authenticate a service consumer; and apply business rule(s) and logic. In an aspect, feedback system 140 can be deployed (e.g., installed, tested, and utilized) as part of business services tier 2530. In another aspect, at least a portion of operation layer(s) 160 can be deployed as part of business services tier 2530. Data that is received, generated, or otherwise available at business services tier 2530 can be retained in business data tier 2540. For example, network intelligence produced as a result of analysis of data associated with a plurality of reports of network performance incidents can be stored in memory elements (databases, tables, registers, etc.) that are deployed as part of business data tier 2540.

Security tier 2550 enables, at least in part, various security features that can be implemented in one or more tiers, such as client access tier 2524, business service access tier 2528, or business services tier 2530. Security tier 2550 also can implement encryption/decryption, management of tokens, security socket layer (SSL) protocol, and so forth. Credentials or any information relevant to implementation of security features can be retained in memory element(s) within business data tier 2540.

Service management tier 2560 can enable data caching, logging procedures, performance management, and fault management. In an aspect, as part of performance management, service management tier 2560 can enable load management (e.g., load balancing) in the client access tier 2524 and business service access tier 2528. In another aspect, service management tier 2560 can implement application server clustering in business service access tier 2528.

Figure 26:
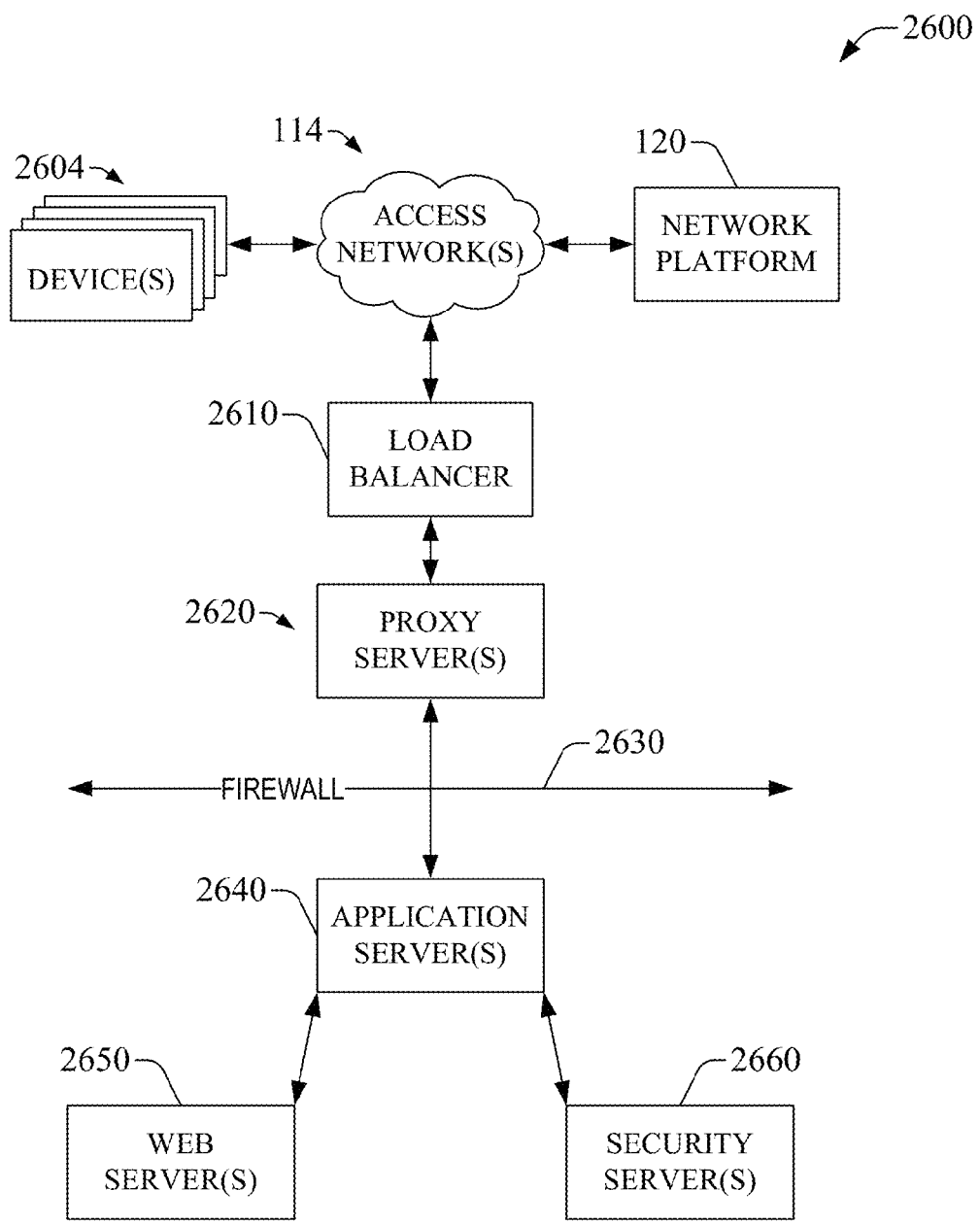

FIG. 26 illustrates a block diagram of an example system 2600 that enables various aspects described herein. The subject example system 2600 embodies, in part, feedback system 140. The parts of example system 2600 that embody the feedback system 140 include load balancer 2610, proxy server(s) 2620, firewall 2630, application server(s) 2640, web server(s) 2650, and security server(s) 2660. Analysis component 144 and feedback component 148 can be part of application server(s) 2640, which can embody server(s) 156. Reports supplied to network platform 120 from a device within the set of one or more device(s) 2604 can be received at the network platform through a radio access network (RAN) that is part of access network(s) 114 and directed to load balancer 2610 via an access network (e.g., the internet) that is part of access network(s) 114. The device includes an incident report component (e.g., 106). Load balancer can determine a proxy server within the set of proxy servers 2620 to route the report (e.g., 110) and related data through firewall 2630 to application server(s) 2640.

Prior to receiving a report, credential of the device that utilizes (e.g., executes) the incident report component 106 is validated through a CSP XML (extensible markup language) API (application programming interface) via security server(s) 2660. The security sever(s) 2660 can be embodied in cryptographic service provider (CSP) server(s). The device (e.g., device 202) that is validated can exploit keychain software for persistence of username and password, session ID, application identity (ID), application passcode, or other security credentials; in an aspect, such credentials can be delivered in HTTPS Headers as part of delivery of data (reports, supplemental data, etc.), received from the device. In addition or in the alternative, web server(s) 2650 can perform CSR lookup prior to implementation of various feedback system 140 methods, as described supra (e.g., FIG. 20-23).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

It should be appreciated that while various aspects, features, or advantages described herein have been illustrated with reference to Wi-Fi access point(s) and associated Wi-Fi coverage, such aspects and features also can be exploited for most any type, or any type, of confined-coverage access point(s) (CCAPs) that provide wireless coverage through substantially any, or any, disparate telecommunication technologies, such as for example femtocell telecommunication or picocell telecommunication. Additionally, aspects, features, or advantages of the subject disclosure can be exploited in substantially any wireless telecommunication technology, or radio technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "incorporates," "has," "possesses," their variations, and the like are employed in the detailed description, claims, appendices and drawings such terms are intended to be inclusive in a manner similar to the term "comprising" as "comprising" is interpreted when employed as a transitional word in a claim.

What is claimed is:

1. A method, comprising:
facilitating, by a user equipment comprising a processor, a display of prompt data that requests input for classifying a geographical location of the user equipment, wherein the facilitating comprises facilitating the display in response to determining that information, usable to provide incident data associated with a network performance incident, has been rendered;
as a function of the facilitating, receiving, by the user equipment, gesture data from an input interface of the user equipment, wherein the gesture data selects the geographical location from a first location that is inside a building and a second location that is outside the building; and
in response to determining, based on the gesture data, that the first location has been selected, directing, by the user equipment, the incident data and the gesture data to a network device of a network to facilitate a determination of performance data associated with a utilization of the network by the user equipment at the first location.

2. The method of claim 1, further comprising:
directing, by the user equipment, signal strength data to the network device to facilitate the determination of the performance data, wherein the signal strength data represents a strength of a signal received by the user equipment from an access point device of the network.

3. The method of claim 1, wherein the facilitating comprises facilitating the display via a graphical interface of the user equipment.

4. The method of claim 3, wherein the receiving comprises receiving a selection of a portion of the prompt data rendered via the graphical interface, and wherein the prompt data comprises categories associated with the geographical location.

5. The method of claim 1, further comprising:
in response to the directing, receiving, by the user equipment, feedback data related to the performance data; and
initiating, by the user equipment, a rendering of the feedback data via a graphical interface of the user equipment.

6. The method of claim 5, wherein the receiving the feedback data comprises receiving timing data indicative of an estimated time period during which a network performance issue associated with the network performance incident is to be resolved.

7. The method of claim 5, wherein the receiving the feedback data comprises receiving network capacity augmentation data indicative of an augmentation action relating to an augmentation of a network capacity associated with the network.

8. The method of claim 1, further comprising:
in response to receiving authorization data that allows an execution of a diagnostic test associated with a performance of the user equipment, determining, by the user equipment, result data indicative of a result of the diagnostic test; and
directing, by the user equipment, the result data to the network device to facilitate the determination of the performance data.

9. The method of claim 1, wherein the directing comprises directing the gesture data to the network device to facilitate characteristic data being determined that represents an in-building propagation loss associated with a signal received from an access point device of the network.

10. The method of claim 1, wherein the directing comprises directing the gesture data to the network device via a text message.

11. A user equipment, comprising:
a processor; and
a memory that stores executable instructions that, when executed by the processor, facilitate performance of operations, comprising:
in response to determining that incident data associated with a network performance incident associated with a network is to be reported to a network device of the network, facilitating a rendering of category data that represents categories associated with a geographical area in which the user equipment is determined to be located, wherein the categories comprise a first category indicative of a first location inside a structure and a second category indicative of a second location outside the structure, wherein the network performance incident is monitored by the user equipment;
in response to receiving gesture data that selects the first category from the categories, determining report data indicative of the user equipment being located indoors, and
initiating a transmission of the report data to the network device, wherein the report data is employable to facilitate a determination of performance data associated with a utilization of the network by the user equipment at the first location.

12. The user equipment of claim 11, wherein the transmission is a first transmission, wherein the operations further comprise:
initiating a second transmission of signal strength data to the network device to facilitate the determination of the performance data, and wherein the signal strength data represents a strength of a signal received by the user equipment from an access point device of the network.

13. The user equipment of claim 11, wherein the report data is employable to calibrate a signal propagation process that acquires a strength of a signal at the second location.

14. The user equipment of claim 11, wherein the operations further comprise:
in response to the transmission, receiving action data related to the performance data, and wherein the action data is indicative of an action associated with resolution of an issue determined to be related to the incident data.

15. The user equipment of claim 11, wherein the initiating the transmission comprises initiating the transmission via a text message.

16. The user equipment of claim 11, wherein the facilitating the rendering comprises facilitating the rendering via a graphical interface of the user equipment.

17. A non-transitory machine readable storage medium comprising instructions that, when executed by a processor of a user equipment, facilitate performance of operations, comprising:
in response to determining that incident data associated with a network performance incident that was observed via the user equipment is to be reported to a network device of network devices of a communication network, facilitating a presentation of prompt data that requests input associated with a classification of a geographical location of the user equipment;
based on the facilitating, receiving, via an input interface of the user equipment, gesture data that selects a location category for the user equipment from a first category that represents that the user equipment is inside a building and a second category that represents that the user equipment is outside the building; and in response to determining, based on the gesture data, that the first category has been selected, initiating a determination of performance data associated with a utilization of the communication network by the user equipment, wherein the performance data represents a performance of the network devices of the communication network.

18. The non-transitory machine readable storage medium of claim 17, wherein the geographical location is a first geographical location, and wherein the operations further comprise:

in response to the determining that the first category has been selected, initiating a calibration of a signal propagation tool that determines a strength of a signal at a second geographical location that is classified to be of the second category.

19. The non-transitory machine readable storage medium of claim 18, wherein the performance data comprises action data indicative of an action that is to be performed to facilitate a resolution of an issue determined to be related to the incident data.

20. The non-transitory machine readable storage medium of claim 17, wherein the operations further comprise:

facilitating a transmission of the input data to the network device via a text message.

* * * * *